(12) United States Patent
Chen et al.

(10) Patent No.: US 11,994,759 B2
(45) Date of Patent: May 28, 2024

(54) LIQUID CRYSTAL DISPLAY APPARATUS

(71) Applicant: HISENSE VISUAL TECHNOLOGY CO., LTD., Shandong (CN)

(72) Inventors: Chao Chen, Shandong (CN); Jinlong Li, Shandong (CN); Zhiqiang Tang, Shandong (CN); Xiaolong Hu, Shandong (CN); Delin Cui, Shandong (CN); Yanquan Zhang, Shandong (CN); Wenping Yao, Shandong (CN); Jiong Wang, Shandong (CN); Fuyuan Wang, Shandong (CN)

(73) Assignee: HISENSE VISUAL TECHNOLOGY CO., LTD., Shandong (CN)

( * ) Notice: Subject to any disclaimer, the term of this patent is extended or adjusted under 35 U.S.C. 154(b) by 0 days.

(21) Appl. No.: 18/056,384

(22) Filed: Nov. 17, 2022

(65) Prior Publication Data

US 2023/0076484 A1    Mar. 9, 2023

Related U.S. Application Data

(63) Continuation of application No. PCT/CN2021/106235, filed on Jul. 14, 2021.

(30) Foreign Application Priority Data

| Jul. 14, 2020 | (CN) | .......................... 202010677158.8 |
| Jul. 22, 2020 | (CN) | .......................... 202010713755.1 |
| Jul. 22, 2020 | (CN) | .......................... 202021462271.6 |
| Jul. 24, 2020 | (CN) | .......................... 202010725841.4 |
| Nov. 10, 2020 | (CN) | .......................... 202022579221.2 |

(51) Int. Cl.
*G02F 1/1333* (2006.01)
*G02F 1/1339* (2006.01)

(52) U.S. Cl.
CPC .. *G02F 1/133314* (2021.01); *G02F 1/133317* (2021.01); *G02F 1/1339* (2013.01)

(58) Field of Classification Search
CPC ........ G02F 1/133615; G02F 1/13356–133567; G02F 1/133504–133507; G02B 6/005–0053
See application file for complete search history.

(56) References Cited

U.S. PATENT DOCUMENTS

2014/0362325 A1*  12/2014  Lee .................. G02F 1/133308
                                                                    445/24

FOREIGN PATENT DOCUMENTS

| CN | 101972812 A |   | 2/2011 |   |
| CN | 202469932 U |   | 10/2012 |   |
| CN | 203068333 U | * | 7/2013 | ........... G02B 6/0088 |

(Continued)

OTHER PUBLICATIONS

International Search Report, dated Sep. 28, 2021, from PCT/CN2021/106235.

*Primary Examiner* — Mariceli Santiago
(74) *Attorney, Agent, or Firm* — Workman Nydegger

(57) ABSTRACT

A liquid crystal display apparatus is provided. The liquid crystal display apparatus comprises a backplane having a second step portion and a first step portion used for supporting a liquid crystal panel, that is, the assembly of optical parts such as a light homogenizing element and an optical film to the liquid crystal panel is implemented in the present application via the backplane without a middle frame.

14 Claims, 16 Drawing Sheets

(56) References Cited

FOREIGN PATENT DOCUMENTS

| | | | | |
|---|---|---|---|---|
| CN | 103302450 | A | 9/2013 | |
| CN | 107209411 | A | 9/2017 | |
| CN | 107884974 | A | 4/2018 | |
| CN | 108089252 | A * | 5/2018 | ............ G02B 6/005 |
| CN | 208609098 | U | 3/2019 | |
| CN | 109648267 | A | 4/2019 | |
| CN | 110568647 | A | 12/2019 | |
| CN | 111151977 | A | 5/2020 | |
| CN | 111200713 | A | 5/2020 | |
| CN | 210573084 | U * | 5/2020 | |
| CN | 210573084 | U | 5/2020 | |
| CN | 211061812 | U | 7/2020 | |
| CN | 111505853 | A | 8/2020 | |
| CN | 211905915 | U | 11/2020 | |
| CN | 213338262 | U | 6/2021 | |
| CN | 213934477 | U | 8/2021 | |
| CN | 213934478 | U | 8/2021 | |
| GB | 2120136 | B | 9/1985 | |
| JP | 2879075 | B2 | 4/1999 | |

* cited by examiner

--Prior art--

//

LIQUID CRYSTAL DISPLAY APPARATUS

CROSS REFERENCE TO RELATED APPLICATIONS

This application is a continuation application of International Application PCT/CN2021/106235 filed Jul. 14, 2021, which claims the priorities of the Chinese patent application No. 202010713755.1 filed on Jul. 22, 2020, the Chinese patent application No. 202021462271.6 filed on Jul. 22, 2020, the Chinese patent application No. 202010677158.8 filed on Jul. 14, 2020, the Chinese patent application No. 202010725841.4 filed on Jul. 24, 2020, and the Chinese patent application No. 202022579221.2 filed on Nov. 10, 2020, The contents of these applications are incorporated herein by reference.

FIELD

The disclosure relates to display field, in particular to a liquid crystal display apparatus.

BACKGROUND

A liquid crystal television generally includes a backlight module and a liquid crystal panel, and the backlight module may be divided into a direct type backlight module and edge-lit backlight module according to different light modes of the backlight module. With the continuous development and increasing maturity of the display field, integration and low-cost of the liquid crystal television have become trends in the industry.

SUMMARY

The disclosure provides a liquid crystal display apparatus. In some embodiments, the liquid crystal display apparatus is a television. The television includes: a liquid crystal panel, including a display region and a circuit board and configured to display an image driven by the circuit board; a backlight source, configured to provide back light for the liquid crystal panel; a light homogenizing element, configured to homogenize light rays from the backlight source, wherein the liquid crystal panel is located on a light emitting side of the light homogenizing element; and a back plane, including a first side, a second side opposite to the first side, a third side and a fourth side opposite to the third side, wherein the fourth side has a second structure different from a first structure which the first side, the second side and the third side all have, and the first side includes a first step portion and a second step portion, wherein the second step portion is configured to support the liquid crystal panel, and the first step portion is configured to support the light homogenizing element.

DETAILED DESCRIPTION OF THE EMBODIMENTS

The embodiments of the disclosure will be clearly and completely described below in combination with the accompanying drawings in the embodiments of the disclosure. Apparently, the described embodiments are only part of the embodiments of the disclosure, not all of them. Based on the embodiments in the disclosure, all other embodiments obtained by those ordinary skilled in the art without making creative work fall within the protection scope of the disclosure.

In the specification, it should be understood that directional or positional relationships indicated by terms such as "center", "upper", "lower", "front", "back", "left", "right", "vertical", "horizontal", "top", "bottom", "inner", "outer" and the like are based on the directional or positional relationships shown in the accompanying drawings, and are only for the convenience of description, rather than indicating or implying that the apparatus or element must have a specific orientation and be constructed and operated in a specific orientation, thus cannot be understood as a limitation of the disclosure.

Figure 1:
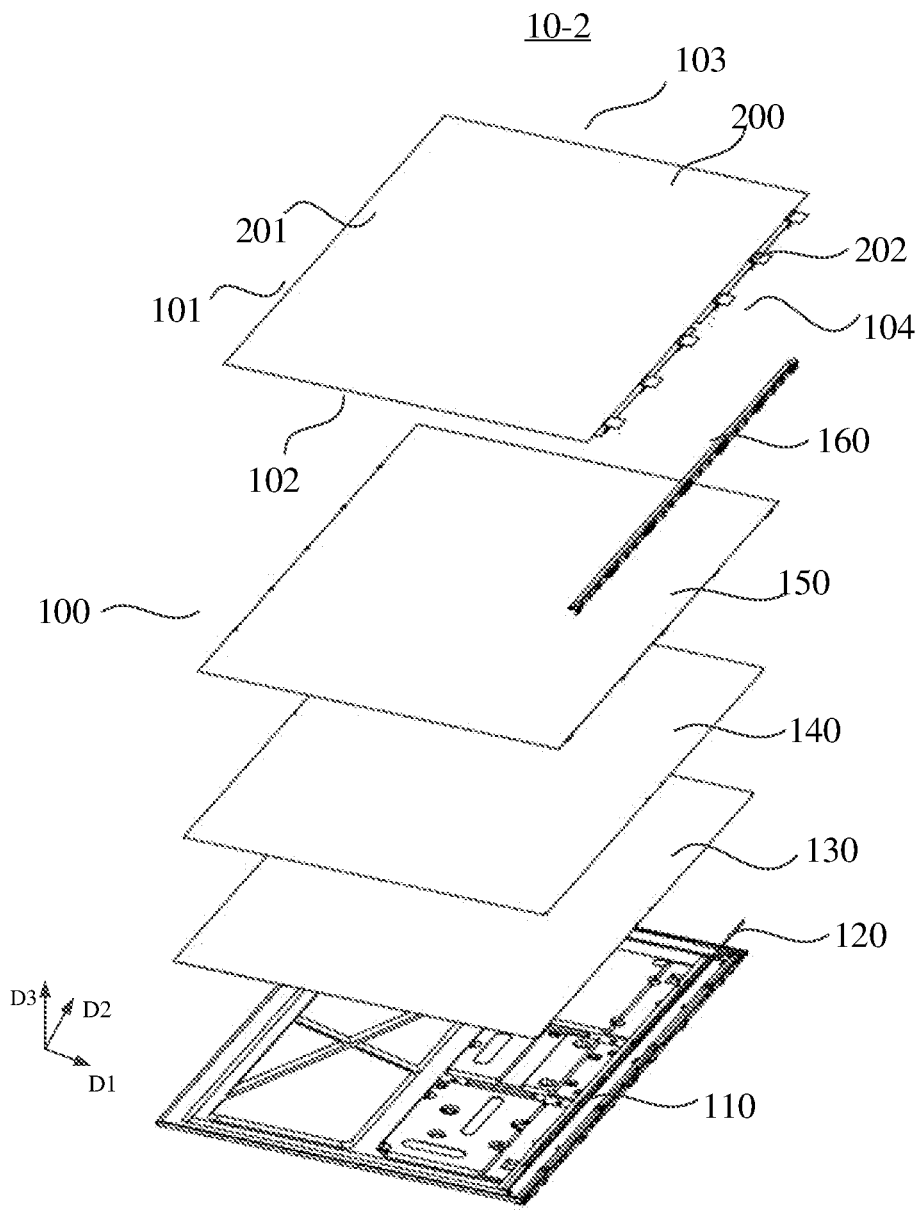
FIG. 1 is a schematic exploded view of a liquid crystal display apparatus according to some embodiments of the disclosure.
Figure 2:
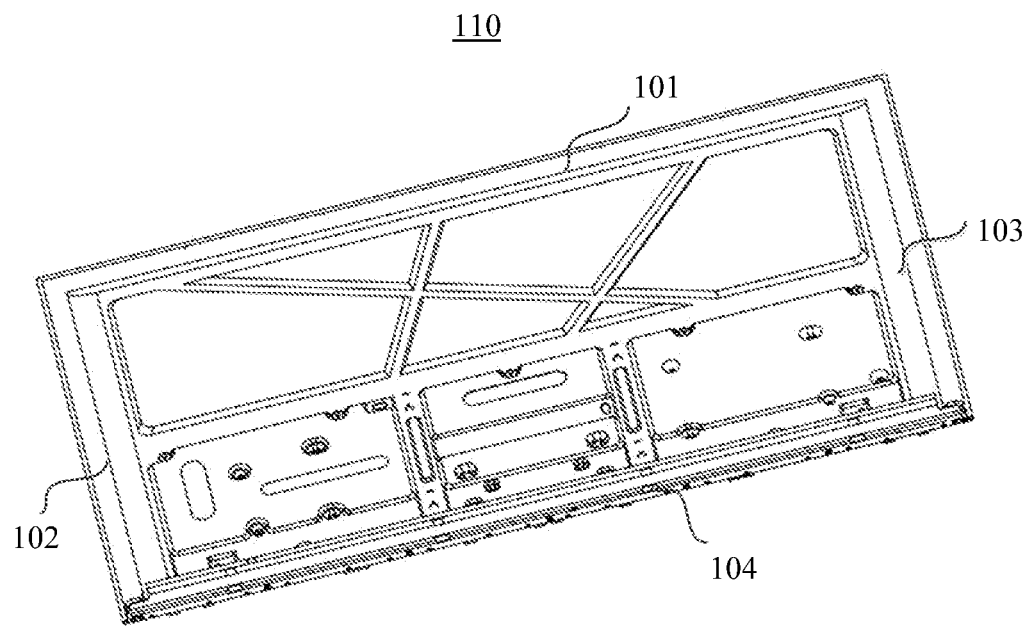
FIG. 2 is a three-dimensional structure diagram of a backplane 110.

FIG. 1 is a schematic exploded view of a liquid crystal display apparatus according to some embodiments of the disclosure. FIG. 2 is a schematic three dimensional diagram of a backplane 110.

Referring to FIG. 1, the liquid crystal display apparatus 10-2 includes a backlight module 100 and a liquid crystal panel 200.

When viewed in a plane, the liquid crystal display apparatus 10-2 is a rectangle with short sides and long sides, a direction of the short sides is referred to as a first direction D1, and a direction of the long sides is referred to as a second direction D2. The second direction D2 is substantially perpendicular to the first direction D1. The backlight module 100 and the liquid crystal panel 200 are sequentially stacked in a third vertical direction D3 that is substantially orthogonal to a plane formed by the first direction D1 and the second direction D2.

The liquid crystal panel 200 is configured to display an image, and includes a display region 201 and a circuit board 202 located on a side of the display region 201, and the whole liquid crystal panel 200 is driven to display an image through the circuit board 202.

The backlight module 100 includes a backplane 110 for supporting, a light source 120, a reflecting plate 130, a light homogenizing element 140, an optical film 150 and a frame 160 arranged in order along a light emitting direction in the liquid crystal display apparatus 10-2. The reflecting plate 130, the light homogenizing element 140 and the optical film 150 work together as optical parts.

The light homogenizing element 140 is configured to homogenize the light rays, and the optical film 150 is located on a light emitting side of the light homogenizing element 140.

It should be noted that the display apparatus in the embodiments of the disclosure is an edge lit display apparatus, and the light homogenizing element 140 is implemented as a light guide plate 140, and the light guide plate 140 is discussed further below. However, for a skilled in the art, the mounting of the films and frames discussed below can be applied to a direct type display apparatus as well, and in the direct type display apparatus, the light homogenizing element is implemented as a diffusion plate.

The liquid crystal display apparatus 10-2 includes a top side 101, a left side 102, a right side 103 and a ground side 104. The top side 101 is opposite to the ground side 104, the left side 102 is opposite to the right side 103, the top side 101 is connected with an end of the left side 102 and an end of the right side 103, and the ground side 104 is connected with the other end of the left side 102 and the other end of the right side 103.

Correspondingly, the liquid crystal panel 200, the backplane 110, the reflecting plate 130, the light guide plate 140 and the optical film 150 in the liquid crystal display apparatus each include a top side, a left side, a right side and a ground side.

The light source 120 is configured to provide light, the light source 120 is located on a side of the display apparatus 10-2, and in some embodiments, the light source 120 is located on the ground side of the display apparatus 10-2.

The light source 120 is implemented as a light bar, including a circuit board and a plurality of LED lights located on the circuit board, and light rays emitted from the light source 120 enter from a side.

The reflecting plate 130 is configured to reflect the light rays to the light emitting direction, which helps to evenly distribute the light rays emitted from the light source. The reflecting plate 130 is fixed on a surface of the backplane 110.

The reflecting plate 130 has a white reflecting surface, and the reflecting plate 130 is made of polyethylene glycol terephthalate (PET).

The light guide plate 140 includes a light incident side and the light emitting side, the light source 120 is located on the light incident side of the light guide plate 140, and the light rays from the light incident side is emitted from the light emitting side of the light guide plate 140 through refraction and total reflection functions of the light guide plate 140, so that a linear light source is converted into an area light source.

The reflecting plate 130 is located on a side opposite to the light emitting side of the light guide plate 140.

The light guide plate 140 is made of glass, polymethyl methacrylate (PMMA) or Polycarbonate (PC).

The optical film 150 is located on the light emitting side of the light guide plate 140 and configured to brighten the light rays.

The optical film 150 may include one or more films, including at least one of a prism film and a brightness enhancing film.

The frame 160 is located on a side of the liquid crystal panel 200 and is configured to fit with a front housing (not shown) and support and shield the circuit board 202 located on the side of the liquid crystal panel 200.

As shown in FIG. 2, the backplane 110 is of a square structure as a whole and includes a top side 101, a left side 102, a right side 103 and a ground side 104. The top side 101 is opposite to the ground side 104, the left side 102 is opposite to the right side 103, the top side 101 is connected with an end of the left side 102 and an end of the right side 103, and the ground side 104 is connected with the other end of the left side 102 and the other end of the right side 103.

In some embodiments of the disclosure, the top side 101, the left side 102 and the right side 103 of the backplane 110 are substantially the same in structure.

The ground side 104 of the backplane 110 does not have the above structure, and the ground side 104 has an opening.

Figure 3:
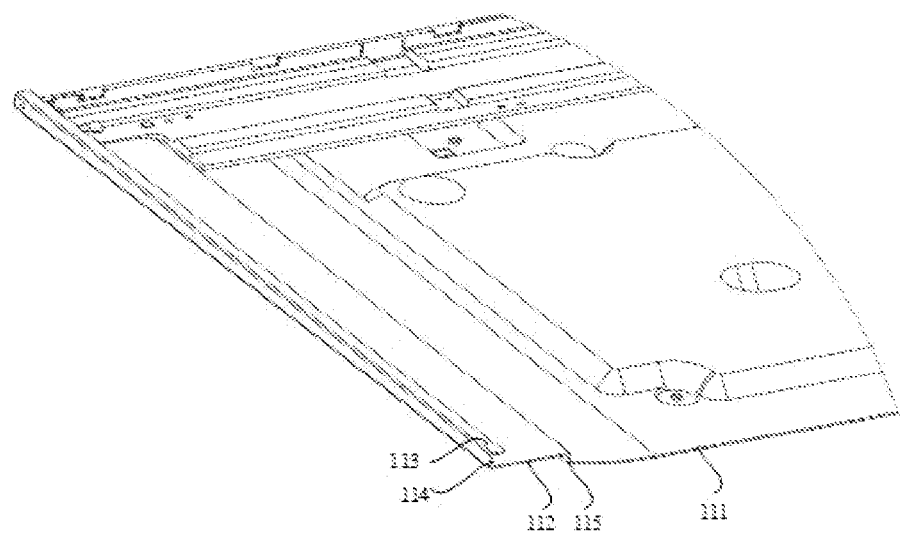
FIG. 3 is a sectional view (left side) of the backplane 110 in FIG. 2 along a direction 102-103 (from left to right).
Figure 4:
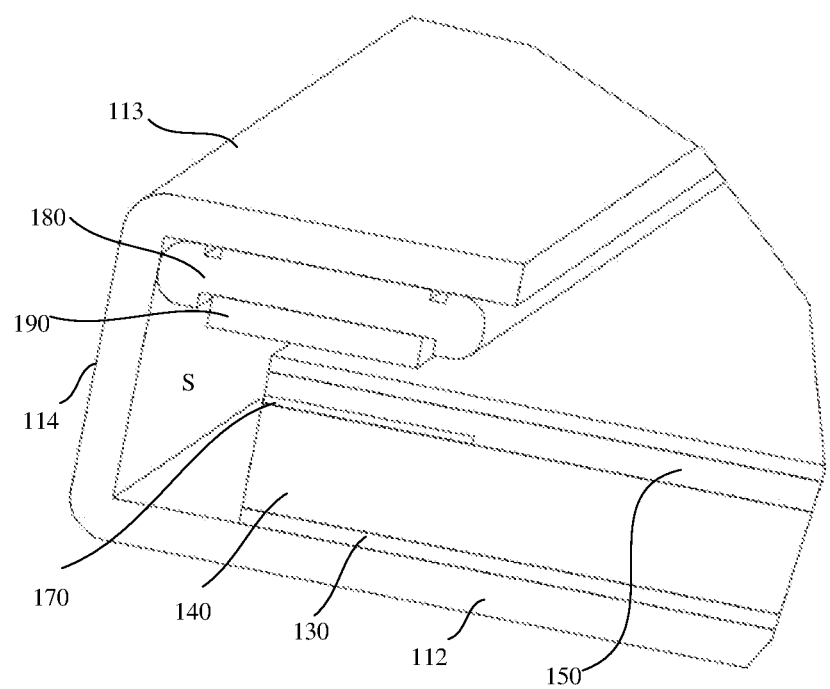
FIG. 4 is a sectional view (top side) of a display apparatus along a direction 101-104 (from top side to ground side) according to some embodiments of the disclosure.
Figure 5:
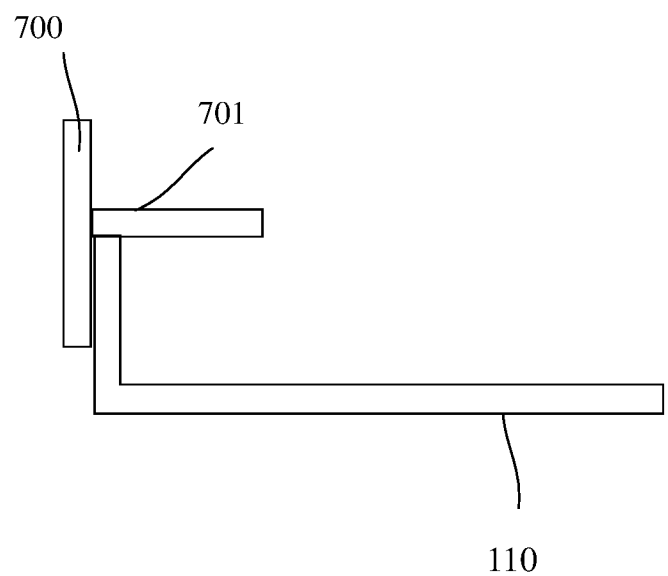
FIG. 5 is a form of a backlight module in the related art.
Figure 6:
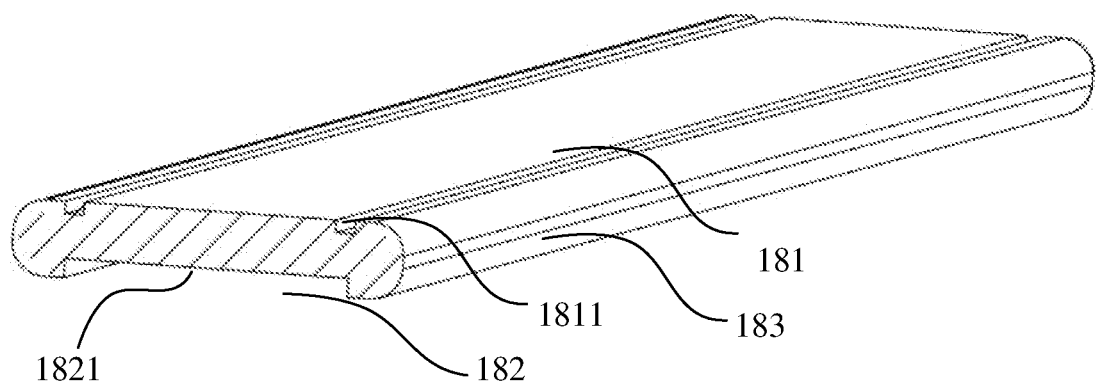
FIG. 6 is a sectional view of an inner frame 180.
Figure 7:
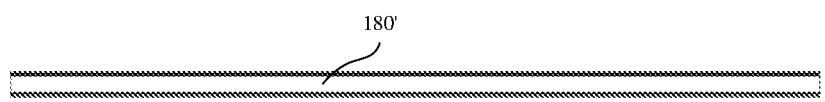
FIG. 7 is a structural diagram of another inner frame 180'.
Figure 8:
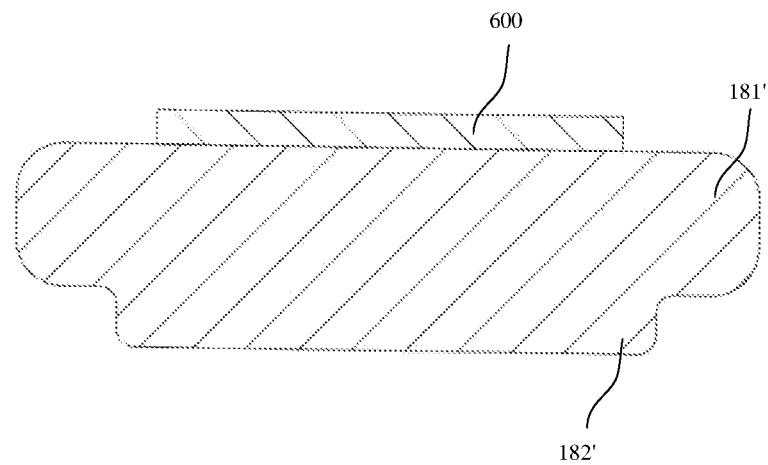
FIG. 8 is a sectional view of the inner frame 180'.
Figure 9:
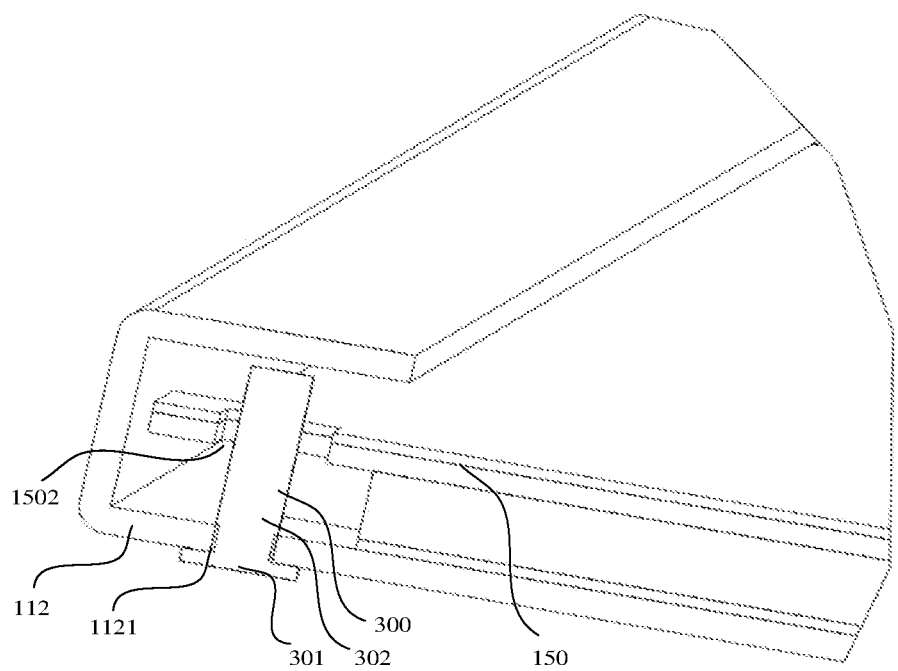
FIG. 9 is another sectional view of a display apparatus along a direction 101-104 according to some embodiments of the disclosure.
Figure 10:
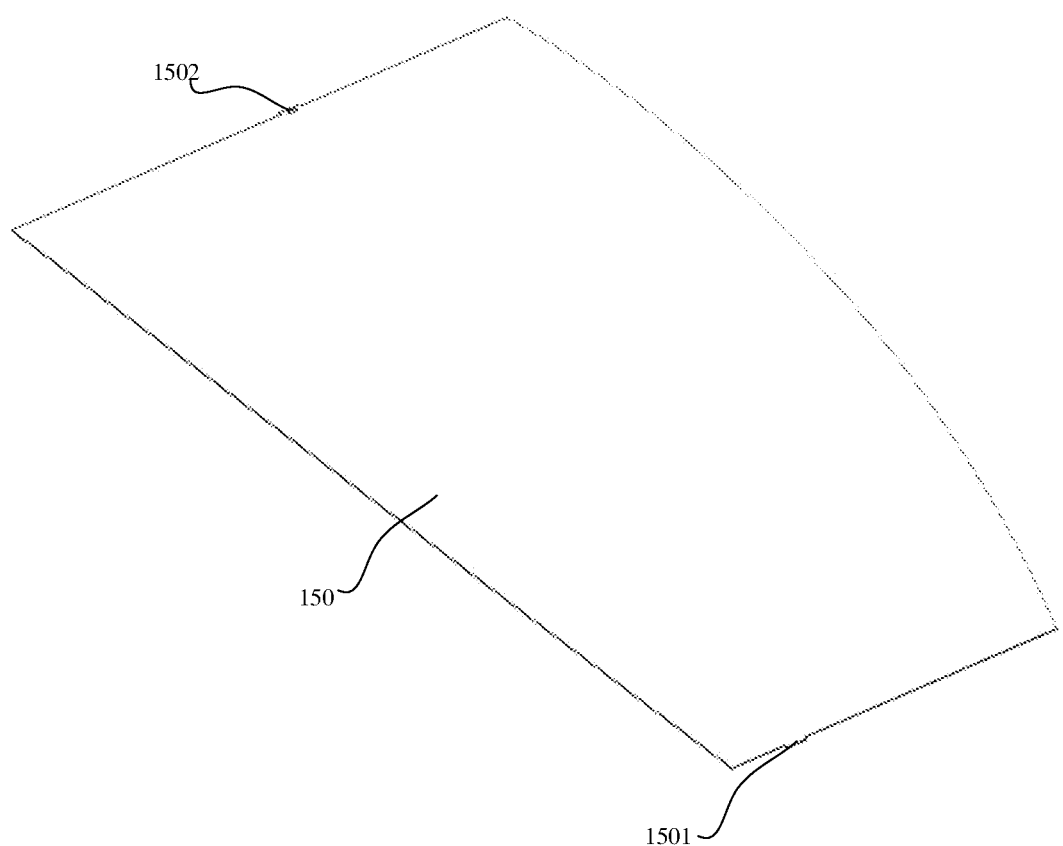
FIG. 10 is a partial schematic structural diagram of an optical film 150 according to some embodiments of the disclosure.
Figure 11:
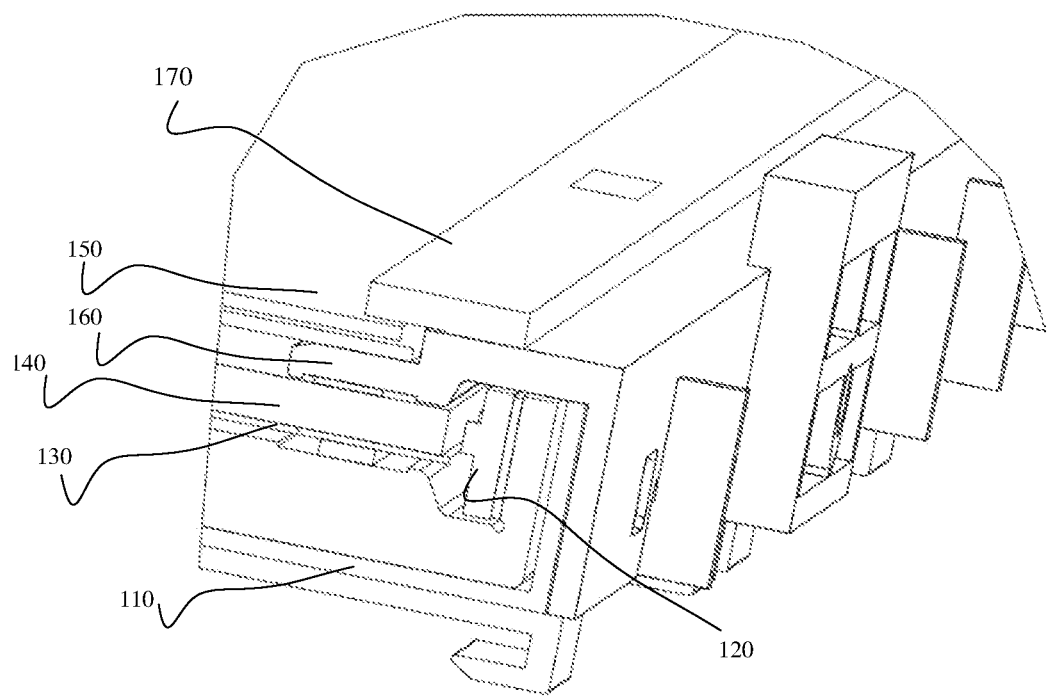
FIG. 11 is another sectional view of a display apparatus along a direction 101-104 according to some embodiments of the disclosure.

FIG. 3 is a sectional view (left side) of the backplane 110 in FIG. 2 along a direction 102-103 (from left to right). FIG. 4 is a sectional view (top side) of the display apparatus along a direction 101-104 (from top side to ground side) according to some embodiments of the disclosure. FIG. 5 shows a backlight module in the related art. FIG. 6 is a sectional view of an inner frame 180. FIG. 7 is a structural diagram of another inner frame 180'. FIG. 8 is a sectional view of the inner frame 180'. FIG. 9 is another sectional view (top side) of the display apparatus along a direction 101-104 (from top side to ground side) according to some embodiments of the disclosure. FIG. 10 is a schematic partial structural diagram of the optical film 150 according to some embodiments of the disclosure. FIG. 11 is another sectional view (ground side) of the display apparatus along a direction 101-104 (from top side to ground side) according to some embodiments of the disclosure.

As shown in FIG. 3, the following description will take one of the left side or the right side of the backplane 110 as an example.

The backplane 110 is of an integrated bend-molded structure.

The backplane 110 includes a flat portion 111, a first step portion 112, a second step portion 113, a side wall 114 for connecting the first step portion 112 and the second step portion 113 and a transition portion 115 for connecting the flat portion 111 and the first step portion 112.

The top side, the left side and the right side of the backplane 110 all have substantially similar structure discussed above.

A plane where the first step portion 112 is located and a plane where the second step portion 113 is located are substantially parallel to a plane where the flat portion 111 is located, and a plane where the side wall 114 is located is substantially perpendicular to the plane where the flat portion 111 is located.

The first step portion 112 and the second step portion 113 have certain extending lengths in the same direction, and the first step portion 112, the second step portion 113 and the side wall 114 for connecting the first step portion 112 and the second step portion 113 form a substantially C shape, that is, a space S is formed by the first step portion 112, the side wall 114 and the second step portion 113.

The first step portion 112 sequentially supports the reflecting plate 130 and the light guide plate 140, that is, edges of the reflecting plate 130 and the light guide plate 140 are received in the space S.

The light guide plate 140 is directly disposed on the first step portion 112, and there is no structure on the first step portion 112 for fixing the light guide plate 140.

The liquid crystal panel 200 is fixed on the second step portion 113, specifically, the liquid crystal panel 200 is fixed on a surface of the second step portion 113 away from the first step portion 112, side edges of the liquid crystal panel 200 are not shielded, which forms a suspending state of the liquid crystal panel 200, resulting in a good visual effect and sense of technology.

The liquid crystal panel 200 is mounted on the second step portion 113 through a bonding element.

Specifically, the bonding element may be implemented as a foam tape. The foam tape has a cushion function in addition to a bonding function, which contributes to protect each portion from being damaged.

In the embodiments of the disclosure, the assembly of the reflecting plate 130 and the light guide plate 140 to the liquid crystal panel 200 is implemented via the first step portion 112 and the second step portion 113. Compared with related art, in the embodiments of the present disclosure, the top side, the left side and the right side of the liquid crystal display apparatus 10-2 no longer require a middle frame to implement the assembly of the reflecting plate and the light guide plate to the liquid crystal panel, thus reducing the costs of the overall display apparatus, and improving manufacture and assembly efficiency.

In the disclosure, the liquid crystal panel 200 is an in-plane switching (IPS) panel. Due to the technical characteristics of the IPS panel itself, when the panel is uneven in local stress, local pressing of liquid crystals will occur, light emitting is obvious under a black field, local light leakage is shown, and when a plane for supporting the IPS panel is uneven locally, the light leakage issue will be obvious due to local panel stress.

FIG. 5 shows a conventional form of the backlight module in related art, including a backplane 110 and a middle frame 700, the middle frame 700 is mounted on the backplane 110, and the middle frame 700 has a support plane 701 for supporting the panel. Since the liquid crystal panel is supported on the middle frame and the backplane, each member will have a manufacturing tolerance when manufactured, and thus the flatness of the support plane 701 depends on an accumulative tolerance of the middle frame and the backplane.

In the disclosure, the liquid crystal panel 200 is directly mounted on the second step portion 113 of the backplane 110, and in this case, the flatness of a support plane (second step portion 113) for supporting the liquid crystal panel is only affected by a tolerance of a single member. Compared with the form in FIG. 5, the form of the C-shaped backplane structure in the present disclosure is more suitable for the IPS panel, and when the display apparatus is formed by the IPS panel adopting the form of the backlight module of the present disclosure, the light leakage issue of the IPS panel is improved significantly.

Since the backplane 110 is formed in C-shape, no middle frame is disposed on the top side, the left side or the right side of the display apparatus 10-2, and the optical film cannot be mounted by disposing a mounting structure on the middle frame, so there is a need to mount the optical film 150 for the display apparatus.

As shown in FIG. 4, a film bonding element 170 is disposed between the light guide plate 140 and the optical film 150 and is configured to mount the optical film 150 on the light guide plate.

The film bonding element 170 is in a long-strip shape, and in order to reduce the optical influence caused by the film bonding element 170, the film bonding element 170 is located on an edge of the light guide plate 140 at the same side with the optical film 150, a width of the film bonding element 170 is configured to be 2 mm to 6 mm, and a thickness of the film bonding element 170 is configured to be 0.1 mm to 0.2 mm.

In some embodiments of the disclosure, the width of the film bonding element 170 is 4 mm.

In some embodiments of the disclosure, the thickness of the film bonding element 170 is 0.15 mm.

In some embodiments of the disclosure, both surfaces of the film bonding element 170 are adhesive, and are attached to a side of the light guide plate and a side of the optical film 150 close to the light guide plate respectively. The film bonding element 170 can be implemented as a double-sided tape. Since the optical film 150 is located on the light emitting side of the light guide plate 140, the film bonding element 170 is attached to the light emitting side of the light guide plate and the side of the optical film 150 close to the light guide plate respectively.

In some embodiments of the disclosure, the film bonding element 170 is only disposed on the top side of the display apparatus, and no film bonding element 170 is disposed on the left side or the right side of the display apparatus.

In some embodiments of the disclosure, the display apparatus 10-2 includes a plurality of film bonding elements 170 which are disposed on a side of the display apparatus at intervals, to avoid difficult attachment and misplaced attachment in actual operations caused by a long film bonding element 170, wherein a length of the film bonding elements 170 is 200 mm to 400 mm.

In some embodiments of the disclosure, the length of the film bonding elements 170 is 300 mm.

Referring to FIG. 4, the embodiments of the disclosure further provide a manner for mounting the optical film.

The liquid crystal display apparatus 10-2 includes an inner frame 180, and the inner frame 180 is disposed on a surface of the side of the second step portion 113 facing the first step portion 112. The inner frame 180 fills in the space S, and can protect the optical film and the light guide plate under the inner frame from bouncing, so that the optical films are mounted firmly and prevented from popping up.

In some embodiments of the disclosure, the inner frame 180 is relatively soft, and has certain elastic force and has a cushion function.

Referring to FIG. 6, the whole inner frame 180 is in a flat long-strip shape, including a first surface 181 and a second surface 182 opposite to each other as well as a connecting surface 183 for connecting the first surface 181 and the second surface 182.

The first surface 181 is mounted on a surface of the side of the second step portion 113 facing the first step portion 112 and is attached through a bonding element or a bonding material.

To facilitate disposing of the bonding element or the bonding material on the first surface 181, at least one first positioning part 1811 is arranged on the first surface 181 to indicate a position of the bonding element or the bonding material.

In some embodiments of the disclosure, two first positioning parts 1811 are disposed on the first surface 181, the two first positioning parts 1811 are disposed at edge positions of the first surface 181 respectively, and a space between the two first positioning parts 1811 may be configured to dispose the bonding element or the bonding material.

In some embodiments of the disclosure, a positioning part 1811 is implemented a recess.

In some embodiments of the disclosure, the display apparatus 10-2 further includes a sealing member 190 located on a side of the inner frame 180 away from the second step portion 113, and the sealing member 190 will be in direct contact with the optical film to prevent the film from fraction damage.

The sealing member 190 and the inner frame 180 are bonded together.

In some embodiments of the disclosure, the sealing member 190 is implemented as a foam tape, the foam tape is of a three-layer structure, two outer layers are a base material and an abrasion-resistant layer respectively, and a middle layer is made of foam. That is, the sealing member 190 includes a first layer, a second layer and a third layer between the first layer and the second layer. That is, the first layer and the second layer are outer layers, and the third layer is a middle layer. The first layer is made of base material and the second layer is made of abrasion-resistant material and the third layer is made of foam.

Similarly, in order to indicate a disposing position of the sealing member 190, at least one second positioning part 1821 is arranged on the second surface 182.

In some embodiments of the disclosure, one second positioning part 1821 is arranged on the second surface 182.

In some embodiments of the disclosure, the second positioning part 1821 is a recess.

In some embodiments of the disclosure, in order to avoid structures with relatively sharp corners from damaging other members, the connecting surface 183 is designed to be arc.

In another embodiment of the disclosure, another inner frame 180' is an integrally extrusion-molded soft frame.

Referring to FIG. 7 and FIG. 8, the inner frame 180' is in a strip shape as a whole, including a first part 181' and a second part 182'. The first part 181' and the second part 182' are different in material, and a material of the second part 182' is softer than a material of the first part 181'.

The first part 181' is mounted on a surface of the side of the second step portion 113 facing the first step portion 112 through a frame bonding element 600. In order to determine a position of the frame bonding element 600 conveniently, the first positioning part 1811 as shown in FIG. 6 is also arranged on a surface of the first part 181'.

When the inner frame 180' is mounted on the backplane, the second part 182' of the inner frame 180' may be in direct contact with the optical film due to the soft material, to prevent the optical film from being abraded, serving a function similar to that of the sealing member 190, so that the sealing member 190 may be omitted when the inner frame 180' is used.

In some embodiments of the disclosure, a width of a cross section of the first part 181' is greater than a width of a cross section of the second part 182', that is, the second part 182' protrudes relative to the first part 181', and by disposing the wider first part 181', it is guaranteed that the frame bonding element 600 has a relatively enough bonding area, resulting in improved mounting effect and a convenient mounting operation. The narrower second part 182' may separate the optical film from the first part 181' to avoid abrasion on the one hand, and reduces a friction area with the optical film as much as possible to avoid the influence caused by wide-range contact between the optical film and the first part 181' on the other hand.

The inner frame 180' is formed in a bi-component extrusion molding, a material of the surface (i.e., the first part 181') being attached to the backplane is polypropylene (PP), a material of the surface (i.e., the second part 182') in contact with the film is thermoplastic vulcanizate (TPV) or thermoplastic elastomer (TPE), and the soft material has a function similar to that of the sealing member to prevent the film from being abraded.

In another embodiment of the disclosure, the inner frame 180 may be omitted, only the sealing member 190 is used, and the sealing member 190 is mounted on the surface of the side of the second step portion 113 facing the first step portion 112.

The sealing member 190 is implemented as a foam tape, the foam tape is of a three-layer structure, two outer layers of the three-layer structure are a base material layer and an abrasion-resistant layer respectively, and a middle layer is made of foam.

In some embodiments of the disclosure, the sealing member 190 is polyurethane foam.

In another embodiment of the disclosure, the inner frame and the sealing member may also be omitted, that is, attachments such as the inner frame and the sealing member are not arranged in the C shape.

Referring to FIG. 9, the disclosure further provides a manner of mounting the optical film 150.

The display apparatus 10-2 includes a screw 300, and the screw 300 includes a nut 301 and a stud 302.

The screw 300 is fastened in the first step portion 112 of the backplane 110 by back-locking, the nut 301 is located on a side of the first step portion 112 away from the second step portion 113, the stud of the screw 300 extends into the space S, correspondingly, a hanging hole 1502 is formed in the optical film 150, and the stud 302 extends into the hole 1502 to fix the optical film 150 and prevent the film from popping out.

Correspondingly, a hole 1121 is formed in the first step portion 112 of the backplane 110, and correspondingly, the hole 1121 is provided with threads matched with the screw 300 to fix the screw 300 to the backplane 110.

In some embodiments of the disclosure, the screw 300 is disposed on a side of the display apparatus 10-2 at intervals.

Referring to FIG. 10, the optical film 150 includes a hanging lug 1501 extending out of an optical film body, and the hanging hole 1502 is entirely or partially formed in the hanging lug 1501.

Referring to FIG. 9, the optical film 150 is held on the stud 302 of the screw 300 through the hanging holes 1502 to secure the optical film 150.

Referring to FIG. 11, in some embodiments of the disclosure, on the ground side 104 of the display apparatus, the optical film 150 is placed on a side of the frame 160 away from the backplane 110, the optical film 150 is fixed to the frame 160 through a film bonding element, and the light guide plate 140 is located on a side of the frame 160 away from the optical film 150.

In some embodiments of the disclosure, the film bonding element is attached on the hanging lug 1501 of the optical film 150, and the hanging lug 1501 are fixed on the frame 160 to fix the optical film.

In some embodiments of the disclosure, the film bonding element is an adhesive tape.

The display apparatus 10-2 includes a plurality of film bonding elements which are disposed on the ground side of the display apparatus at intervals.

As such, the optical film 150 on the top side is located in the space S, namely placing the film below, and on the ground side, the optical film is placed above the lower frame, namely placing the film above, so that the optical film is fixed by being placed below and above.

In the embodiments of the disclosure, due to the limit of machining processes, a height of the space, namely a distance between the first step portion 112 and the second step portion 113, is greater than or equal to 4 mm.

In the embodiments of the disclosure, a thickness h of the inner frame 180 is 1 mm to 2.5 mm, so that the reflecting plate and the light guide plate can be conveniently assembled between the first step portion 112 and the second step portion 113.

In some embodiments of the disclosure, a width of the second step portion 113 is 6 mm to 10 mm to guarantee that the liquid crystal panel 200 and the second step portion 113 have an enough mounting area and the display apparatus has a narrower bezel.

In some embodiments of the disclosure, a width of the inner frame 180 is 2 mm to 10 mm. The inner frame 180 is bonded to a position, close to an edge of the second step portion 113, on a surface of a side of the second step portion 113 facing the first step portion 112, so that the mounting tool can conveniently attach a rubber strip 400-1 to the surface of the side of the second step portion 113 facing the first step portion 112.

In some embodiments of the disclosure, inner frame 180 are attached to the top side, the left side and the right side of the backplane 110 respectively, and such arrangement can better stabilize the light guide plate.

In some embodiments of the disclosure, the inner frames 180 are only attached to the top side of the backplane 110, or the inner frames 180 are only attached to the left side and the right side of the backplane 110, so that the cost can be further lowered.

In some embodiments of the disclosure, the flat portion 111, the transition portion 115, the first step portion 112, the side wall 114 and the second step portion 113 of the backplane 110 are of an integrated structure, which manifests the integration and concentration of the liquid crystal display apparatus better.

In order to form the integrated structure of the backplane 110, in terms of manufacturing, manufacture may be performed in an integrated bending manner, the integrated bending process enhances the strength of the backplane 110, and the backplane 110 may be thinner in the case of meeting the same strength requirement. Meanwhile, by adopting the integrated bending manner, no connection opening exists, so that the good appearance is realized.

An assembly process of the liquid crystal display apparatus 10-2 is discussed below.

When the liquid crystal display apparatus 10-2 is being assembled, the inner frame 180 is attached to at least one of the top side 101, the left side 102 or the right side 103 of the backplane 110 as shown in FIG. 2 through a tool first, then the reflecting plate 130 and the light guide plate 140 are inserted into the space S formed on the backplane 110 from the ground side 104 of the backplane 110, the frame 160 is clamped on the ground side of the backplane 110, the top side of the optical film 150 is placed in a top side cavity of the backplane 110, the ground side of the optical film is placed on the frame, and then the liquid crystal panel 200 is subject to attachment assembly, so that the assembly of the liquid crystal display apparatus 10-2 is completed.

According to the disclosure, in the liquid crystal display apparatus, a backplane is provided with a second step portion and a first step portion configured to support a liquid crystal panel, that is, the assembly of optical parts such as a light homogenizing element and an optical film to the liquid crystal panel is accomplished in the disclosure via the backplane. Compared with the related art, in the embodiments of the disclosure, some end sides of the liquid crystal display apparatus no longer require a middle frame to implement the assembly of the optical parts such as the light homogenizing element and the optical film to the liquid crystal panel, thus reducing the costs of the overall display apparatus, and increasing production and assembly efficiency.

The display apparatus in some embodiments of the disclosure is a direct type display apparatus, and the light homogenizing element 140 is implemented as a diffusion plate 140-1, and is discussed below as the diffusion plate 140-1.

Figure 12:
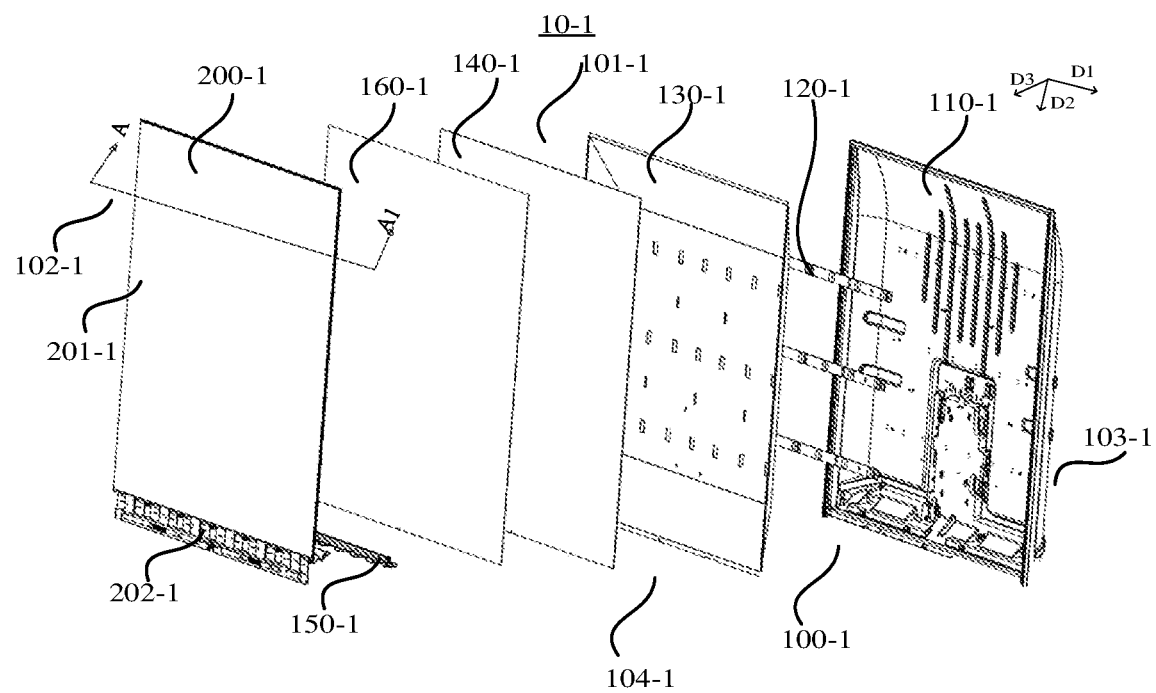
FIG. 12 is another schematic exploded view of a liquid crystal display apparatus according to the embodiments of the disclosure.
Figure 13:
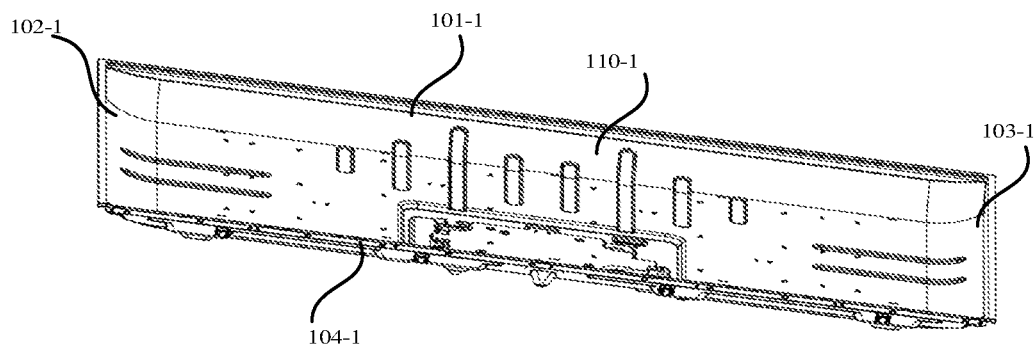
FIG. 13 is a schematic three dimensional diagram of a backplane 110-1.

FIG. 12 is another exploded perspective view of a liquid crystal display apparatus according to some embodiments of the disclosure. FIG. 13 is a schematic three dimensional diagram of a backplane 110-1.

Referring to FIG. 12, the liquid crystal display apparatus 10-1 includes a backlight module 100-1 and a liquid crystal panel 200-1.

When viewed in a plane, the liquid crystal display apparatus 10-1 is a rectangle with short sides and long sides, a direction of the short sides is called a first direction D1, and a direction of the long sides is called a second direction D2. The second direction D2 is substantially perpendicular to the first direction D1. The backlight module 100-1 and the liquid crystal panel 200-1 are sequentially arranged along a third vertical direction D3 that is substantially orthogonal to a plane of the first direction D1 and the second direction D2.

The liquid crystal panel 200-1 is configured to display an image, and includes a display region 201-1 and a circuit board 202-1 located on a side of the display region 201-1, and the whole liquid crystal panel 200-1 is driven to display an image through the circuit board 202-1.

The backlight module 100-1 includes the backplane 110-1 for support function, a light source 120-1, a reflecting plate 130-1, a diffusion plate 140-1 and a middle frame 150-1 in order along a light emitting direction of light rays in the liquid crystal display apparatus 10-1.

The liquid crystal display apparatus 10-1 includes a top side 101-1, a left side 102-1, a right side 103-1 and a ground side 104-1. The top side 101-1 and the ground side 104-1 are opposite, the left side 102-1 and the right side 103-1 are opposite, the top side 101-1 is connected with an end of the left side 102-1 and an end of the right side 103-1, and the ground side 104-1 is connected with the other end of the left side 102-1 and the other end of the right side 103-1.

Correspondingly, the liquid crystal panel 200-1, the backplane 110-1, the reflecting plate 130-1 and the diffusion plate 140-1 in the liquid crystal display apparatus each include a top side, a left side, a right side and a ground side.

The light source 120-1 is configured to provide light, and includes a plurality of LED light bars disposed in the first direction D1, and the plurality of LED light bars are substantially parallel. Each light bar includes a circuit board and a plurality of LED lights located on a side of the circuit board, the other side of the circuit board is in contact with the backplane, and the light bars are fixed on the backplane 110-1 through connecting parts.

The reflecting plate 130-1 is configured to reflect the light rays to the light emitting direction. The reflecting plate 130-1 is fixed on a surface of the backplane 110-1, and the reflecting plate 130-1 is provided with a plurality of through holes for exposing the LED lights.

The diffusion plate 140-1 is configured to refract and reflect the light rays from the light source 120-1, thus homogenizing the light rays.

The middle frame 150-1 is located on a side of the liquid crystal panel 200-1 and is configured to fit with a front housing (not shown) and support and shield the circuit board 202-1 located on the side of the liquid crystal panel 200-1.

The backlight module 100-1 further includes a support structure for supporting the diffusion plate 140-1, which is located on the backplane 110-1, thus guaranteeing a distance for light mixing in the liquid crystal display apparatus 10-1.

As shown in FIG. 13, the backplane 110-1 is of a square structure as a whole and includes the top side 101-1, the left side 102-1, the right side 103-1 and the ground side 104-1. The top side 101-1 and the ground side 104-1 are opposite to each other, the left side 102-1 and the right side 103-1 are opposite to each other, the top side 101-1 is connected with an end of the left side 102-1 and an end of the right side 103-1, and the ground side 104-1 is connected with the other end of the left side 102-1 and the other end of the right side 103-1.

In some embodiments of the disclosure, the top side 101-1, the left side 102-1 and the right side 103-1 of the backplane 110-1 have substantially similar structure.

The ground side 104-1 of the backplane 110-1 does not have similar structure to the above structure, and the ground side 104-1 has an opening.

Figure 14:
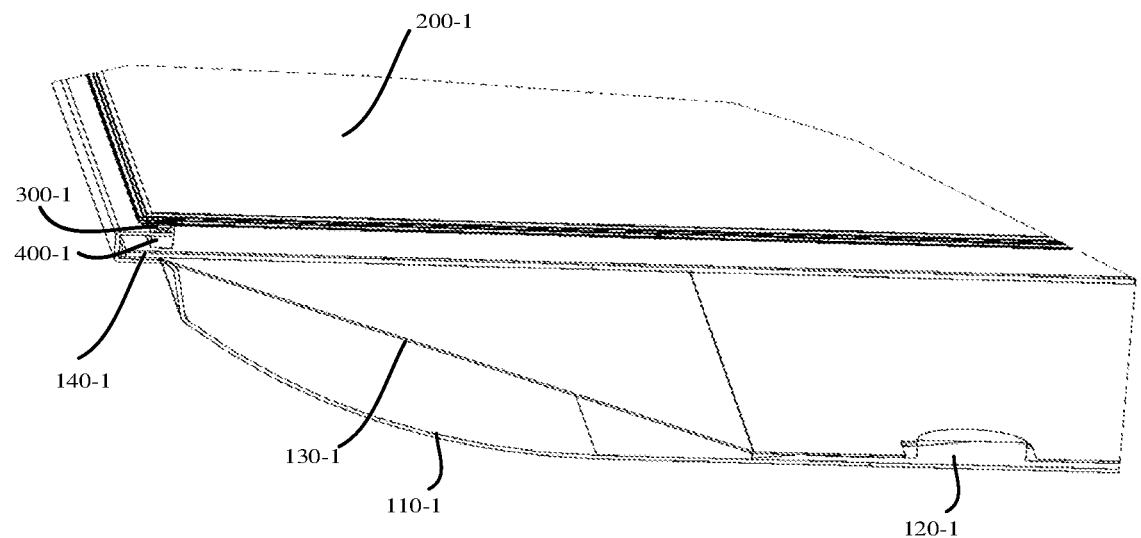
FIG. 14 is a sectional view of the liquid crystal display apparatus in FIG. 12 along a direction A-A1.
Figure 15:
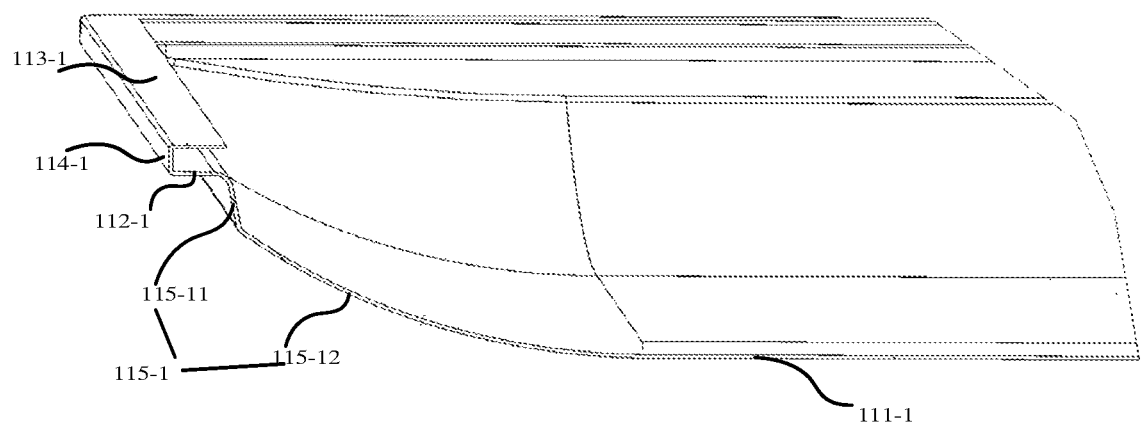
FIG. 15 is a sectional view of a backplane 110-1 along a direction A-A1.
Figure 16:
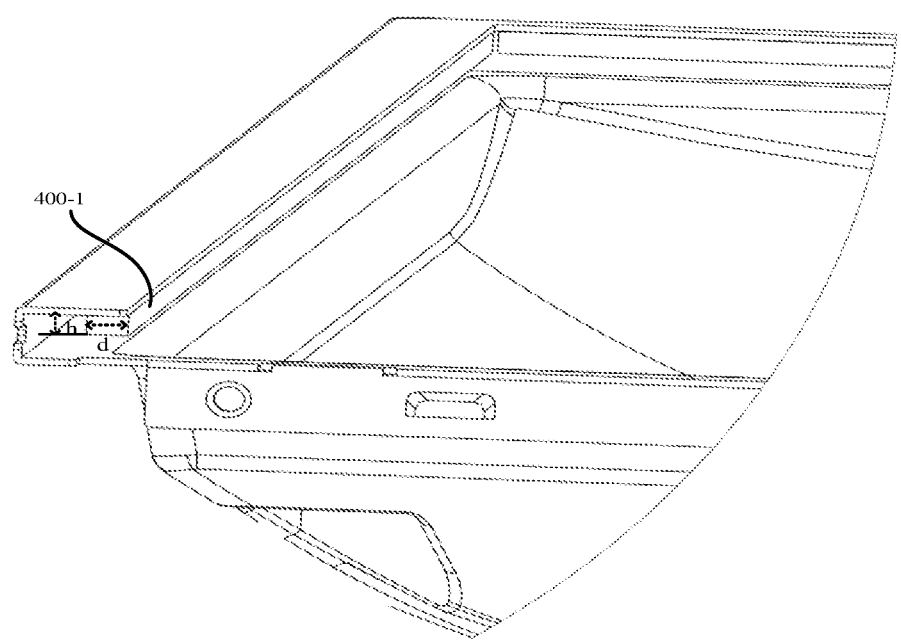
FIG. 16 is a schematic three dimensional diagram of a backplane 110-1 and a rubber strip 400-1 after assembly.

FIG. 14 is a sectional view of the liquid crystal display apparatus in FIG. 12 along a direction A-A1. FIG. 15 is a sectional view of the backplane 110-1 along the direction A-A1. FIG. 16 is a schematic three dimensional diagram of the backplane 110-1 and a rubber strip 400-1 after assembly.

As shown in FIGS. 14-15, description will take one of the left side and the right side of the backplane 110-1 as an example.

The backplane 110-1 includes a flat portion 111-1, a first step portion 112-1, a second step portion 113-1, a side wall 114-1 for connecting the first step portion 112-1 and the second step portion 113-1 and a transition portion 115-1 for connecting the flat portion 111-1 and the first step portion 112-1.

The top side, the left side and the right side of the backplane 110-1 all have substantially similar structures.

A plane where the first step portion 112-1 is located and a plane where the second step portion 113-1 is located are substantially parallel to a plane where the flat portion 111-1 is located, and a plane where the side wall 114-1 is located is substantially perpendicular to the plane where the flat portion 111-1 is located.

The first step portion 112-1 and the second step portion 113-1 have certain extending lengths in the same direction, and the first step portion 112-1, the second step portion 113-1 and the side wall 114-1 for connecting the first step portion 112-1 and the second step portion 113-1 form a C shape, that is, a space S is formed by the first step portion 112-1, the side wall 114-1 and the second step portion 113-1.

The first step portion 112-1 sequentially supports the reflecting plate 130-1 and the diffusion plate 140-1, that is, edges of the reflecting plate 130-1 and the light guide plate 140-1 are received in the space S.

The reflecting plate 130-1 and the diffusion plate 140-1 are directly placed on the first step portion 112-1 without a fixing structure.

In some embodiments of the disclosure, the reflecting plate 130-1 and the diffusion plate 140-1 are fixed by bonding on the ground side 104-1 of the liquid crystal display apparatus 10-1.

The liquid crystal panel 200-1 is mounted on the second step portion 113-1, side edges of the liquid crystal panel 200-1 are not shielded, thus realizing a suspending state of the liquid crystal panel 200-1 as a whole, which has a good visual effect and a sense of technology.

The liquid crystal panel 200-1 is fixed on the second step portion 113-1 through a bonding element 300-1.

Specifically, the bonding element 300-1 may be a foam tape. The foam tape has a cushion function in addition to a bonding function, so as to reduce abrasion for each member.

In some embodiments of the disclosure, the assembly of the reflecting plate 130-1 and the diffusion plate 140-1 to the liquid crystal panel 200-1 is implemented via the first step portion 112-1 and the second step portion 113-1. Compared with the related art, in the embodiments of the disclosure, the top side, the left side and the right side of the liquid crystal display apparatus 10-1 no longer require a middle frame to implement the assembly of the reflecting plate and the diffusion plate to the liquid crystal panel, thus reducing the costs of the overall display apparatus, and increasing manufacture and assembly efficiency.

In some embodiments of the disclosure, limited by a manufacturing process, a height of the space S, namely a distance between the first step portion 112-1 and the second step portion 113-1, is designed to be 4 mm as the minimum, that is, the distance between the first step portion 112-1 and the second step portion 113-1 is greater than or equal to 4 mm, a total thickness of the reflecting plate 130-1 and the diffusion plate 140-1 is 1.15 mm, the reflecting plate 130-1 and the diffusion plate 140-1 cannot fill the space S to full, the liquid crystal display apparatus 10-1 further includes the rubber strip 400-1, and the rubber strip 400-1 is disposed on a surface of a side of the second step portion 113-1 facing the first step portion 112-1. On the one hand, the rubber strip 400-1 fills the space S and can block the reflecting plate and the diffusion plate below it from bouncing, so as to further fix the diffusion plate, and on the other hand, the rubber strip 400-1 is located above the diffusion plate, which can avoid optical parts located at top of the diffusion plate and a side of the second step portion 113-1 from being abraded and damaged.

In some embodiments of the disclosure, a thickness h of the rubber strip 400-1 is 1 mm to 2.5 mm to guarantee the two functions above, and the reflecting plate and the diffusion plate can be conveniently mounted between the first step portion 112-1 and the second step portion 113-1.

In some embodiments of the disclosure, a width of the second step portion 113-1 is 6 mm to 10 mm to make sure that the liquid crystal panel 200-1 and the second step portion 113-1 have enough mounting area and the display apparatus has a narrower bezel.

In some embodiments of the disclosure, a width d of the rubber strip 400-1 is 2 mm to 4 mm. The rubber strip 400-1 is attached to a position, close to an edge of the second step portion 113-1, the surface of the side of the second step portion 113-1 facing the first step portion 112-1, so that the mounting tool can conveniently attach the rubber strip 400-1 to the surface of the side of the second step portion 113-1 facing the first step portion 112-1.

In some embodiments of the disclosure, the rubber strip 400-1 is attached to the top side, the left side and the right side of the backplane 110-1 respectively, and such arrangement can better stabilize the diffusion plate.

In some embodiments, the rubber strip 400-1 is only attached to the top side of the backplane 110-1, so that the cost can be further lowered.

In some embodiments of the disclosure, the transition portion 115-1 includes a first transition portion 115-11 and a second transition portion 115-12 connected with each other, the first transition portion 115-11 is connected with the first step portion 112-1, and the second transition portion 115-12 is connected with the flat portion 111-1.

The transition portion 115-1 provides enough distance for light mixing between the light source 120-1 and the diffusion plate 140-1, and guarantees that the light rays emitted from the light source 120-1 can be mixed evenly with the cooperation of the reflecting plate 130-1.

Since the plane where the first step portion 112-1 is located is parallel to the plane where the flat portion 111-1 is located, in order to guarantee smooth transition between the first step portion 112-1 and the flat portion 111-1, as shown in the sectional view shown in FIG. 15, an included angle between the first transition portion 115-11 and the plane where the flat portion 111-1 is located needs to be greater than an included angle between the second transition portion 115-12 and the plane where the flat portion 111-1 is located, which makes the connection between the two members first steep and then relatively gentle. Compared with single-angle transition, the above arrangement may make the backplane have a sense of layers, the thickness of the backplane may be reduced through connection of different angles, and the backplane is thinner visually. Compared with steep connection after gentle connection, it satisfies the aesthetic feeling of people, and the appearance is more pleasing.

In some embodiments of the disclosure, the flat portion 111-1, the transition portion 115-1, the first step portion 112-1, the side wall 114-1 and the second step portion 113-1 of the backplane 110-1 are of an integrated structure, which manifests the integration and concentration of the liquid crystal display apparatus better.

In order to form the integrated structure of the backplane 110-1, in terms of manufacturing, manufacturing may be performed in an integrated bending manner, the integrated bending process enhances the strength of the backplane 110-1, and the backplane 110-1 may be thinner on the premise of the same strength requirement. Meanwhile, by adopting the integrated bending manner, no connection opening exists, resulting a good appearance.

In some embodiments of the disclosure, the liquid crystal display apparatus 10-1 may further include one or more optical films 150. The one or more optical films 150 are located on the light emitting side of the diffusion plate 140-1 and configured to brighten the light rays.

In another embodiment of the disclosure, the liquid crystal display apparatus 10-1 may not include the one or more optical films 150, and the one or more optical films 150 may be omitted by adjusting a silk-screen printing mode of the diffusion plate 140-1, thus further lowering the manufacturing cost.

An assembly process of the liquid crystal display apparatus 10-1 is discussed below.

During assembly of the liquid crystal display apparatus 10-1, the rubber strip 400-1 is attached to at least one of the top side 101-1, the left side 102-1 or the right side 103-1 of the backplane 110-1 as shown in FIG. 13 through a tool first, then the reflecting plate 130-1 and the diffusion plate 140-1 are inserted into the space S formed on the backplane 110-1 from the ground side 104-1 of the backplane 110-1, and then the liquid crystal panel 200-1 is mounted by attachment, so the assembly of the liquid crystal display apparatus 10-1 is realized.

During the assembly of the display apparatus, there are more and more backplanes which are integrally bent into, for example, a C shape or a U shape, and in order to prevent the film from being abraded, a sealing member (e.g., a sealing strip), a rubber strip or an inner frame usually needs to attach to the inner wall of a C-shaped space or a U-shaped space. At present, a conventional procedure is usually to paste the sealing member in the C-shaped space or a U-shaped space by pure manual operations, which wastes time and labor, and does not have high mounting precision or efficiency; and assistant tools are used in some cases, but the mounting precision and efficiency are still not desirable.

Figure 17:
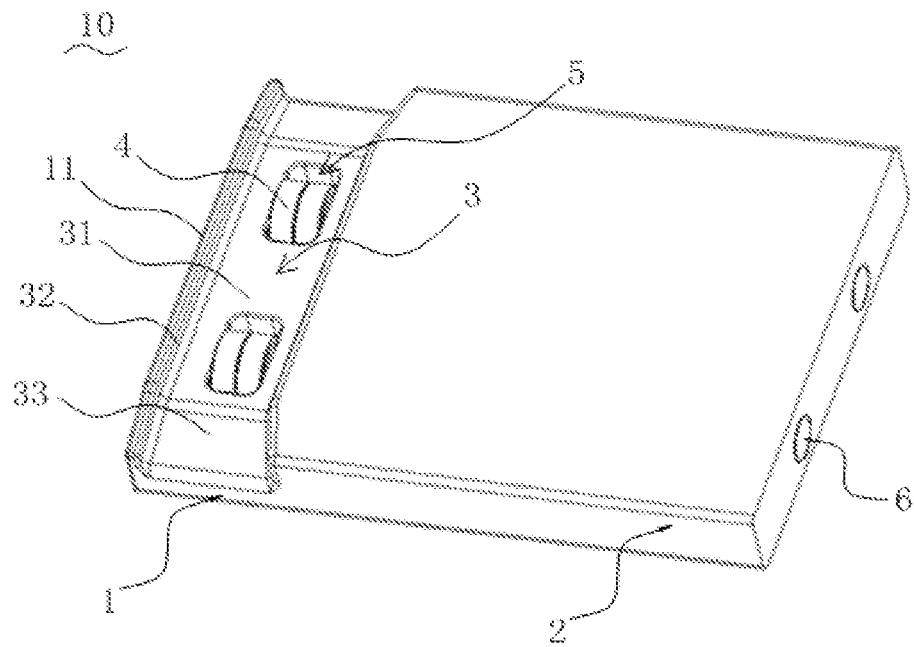
FIG. 17 is a schematic structural diagram of a mounting tool according to an embodiment of the disclosure.
Figure 18:
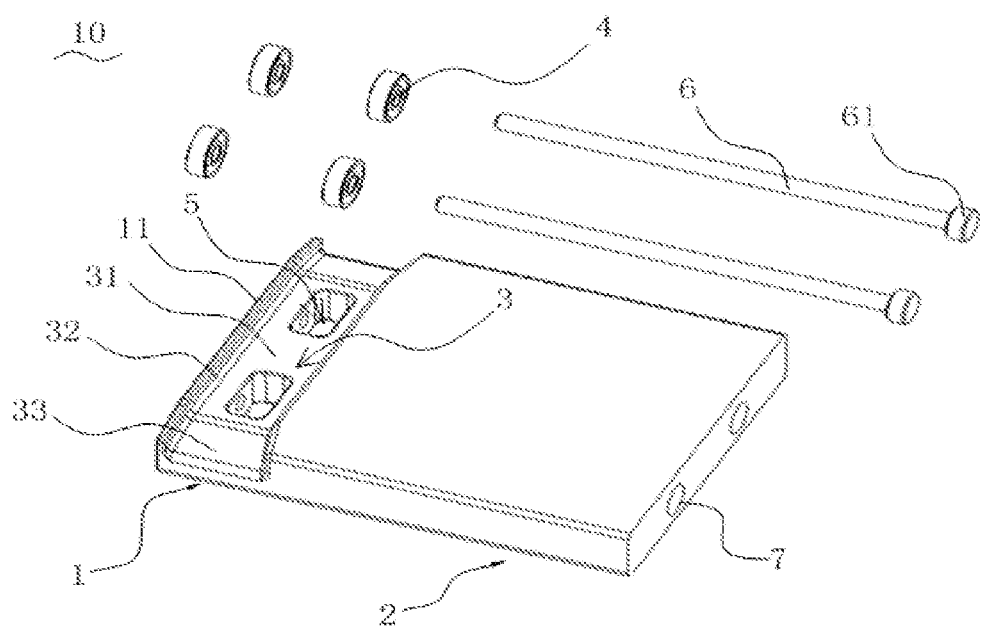
FIG. 18 is an exploded view of FIG. 17.
Figure 19:
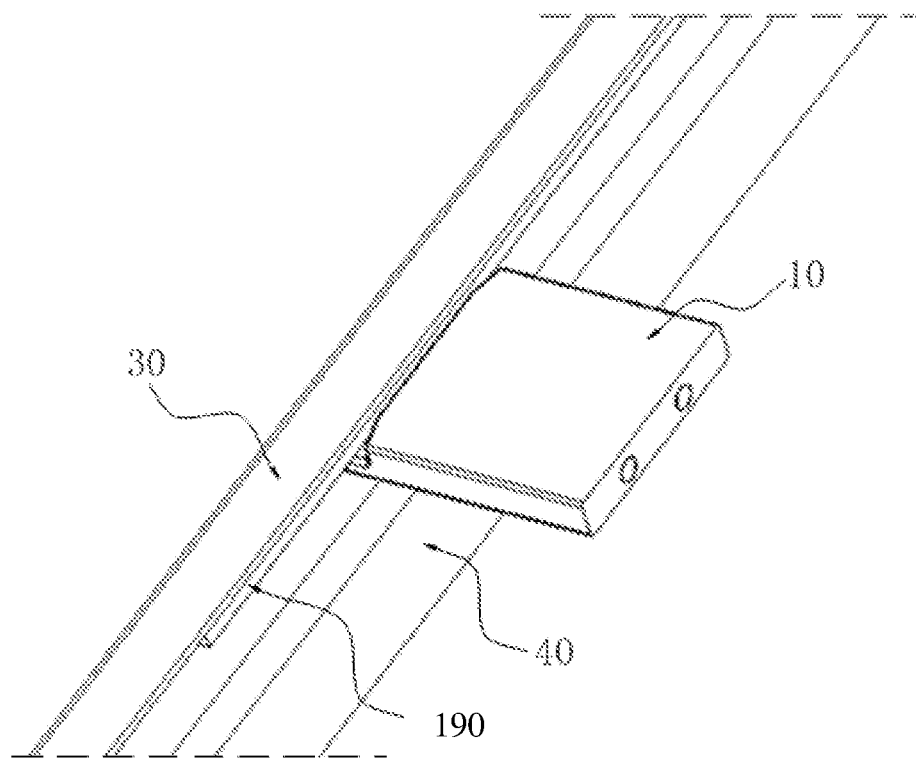
FIG. 19 is a schematic diagram of the mounting tool in FIG. 17 expanding into a slot to attach a sealing member.
Figure 20:
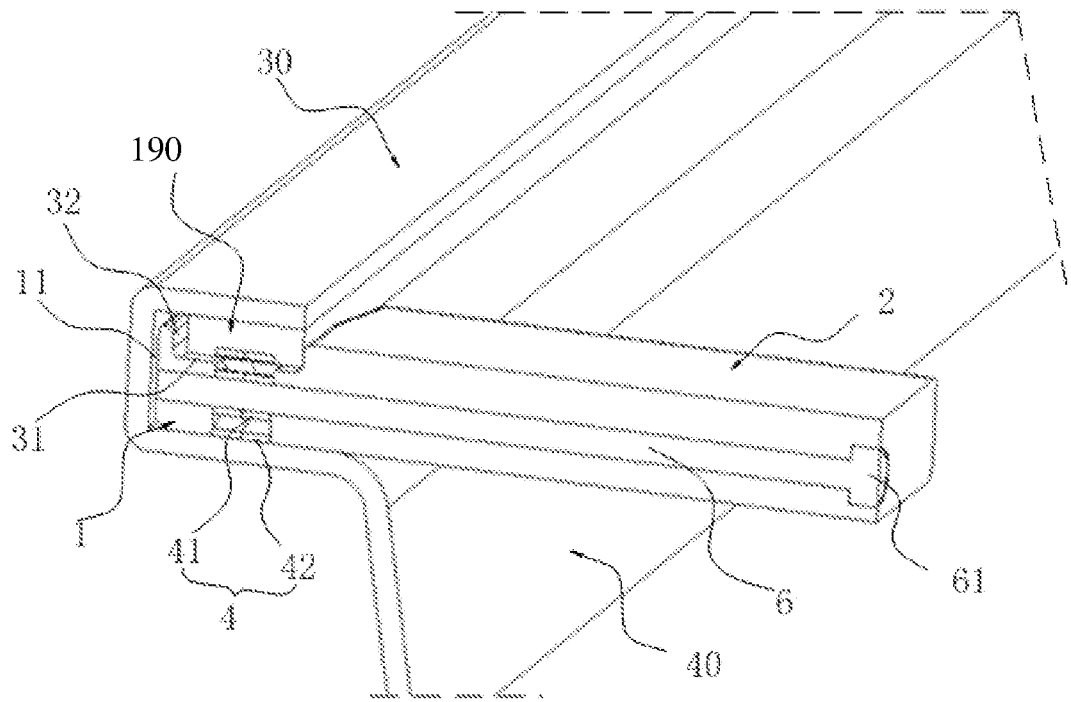
FIG. 20 is a local sectional view of FIG. 19.

FIG. 17 is a schematic structural diagram of a mounting tool according to an embodiment of the disclosure. FIG. 18 is an exploded view of FIG. 17. FIG. 19 is a schematic diagram of the mounting tool of FIG. 17 expanding into a groove to attach a sealing member. FIG. 20 is a local sectional view of FIG. 19.

Referring to FIG. 17, the mounting tool 10 according to some embodiments of the disclosure is configured to attach the strip-shaped sealing member 190 in the mounting groove 30 extending along a straight line, and the mounting groove 30 may be in C-shape or a U-shape formed by the integrally bended backplane 110-1. The mounting tool 10 has an end 1 which may expand into the mounting groove 30 and slide along the mounting groove 30 and a handheld end 2 opposite to the end 1. The handheld end 2 may be held by an operator to make the end 1 stretch into and abut against the inside of the mounting groove 30 and slide relative to the mounting groove 30.

An end surface of the end 1 is used as an abutting surface 11. When the end 1 stretches into the mounting groove 30, the abutting surface 11 may abut against an inner wall of the mounting groove 30 to make the end 1 parallelly slide along the mounting groove 30.

It can be understood that the end surface of the end 1 may be a plane or a non-plane surface. When the end surface of the end 1 is a plane surface, the plane surface is directly used as the abutting surface 11 and may make the end 1 slide more stably. When the end surface of the end 1 is a non-plane surface, as shown in FIG. 17, a plurality of protrusions distributed at intervals are arranged on a left end surface of the end 1 in a protruding mode, the leftmost ends of the plurality of protrusions are located in a same plane, this plane may be used as the abutting surface 11, and in this way, friction force between the abutting surface 11 and the inner wall of the mounting groove 30 may be reduced, so that the end 1 slides along the mounting groove 30 more smoothly.

A limiting groove 3 is formed in a side surface of the end 1 adjacent to the abutting surface 11. The limiting groove 3 extends along a straight line, and the two ends of the limiting groove 3 penetrate through two opposite side surfaces of the end 1 respectively. An extending direction of the limiting groove 3 is parallel to the abutting surface 11. When the end 1 extends into the mounting groove 30 to make the abutting surface 11 abut against the inner wall of the mounting groove 30, the extending direction of the limiting groove 3 is parallel to a length extending direction of the mounting groove 30.

The limiting groove 3 is defined by a bottom surface 31 extending along a straight line and side walls 32 located on the two sides of the bottom surface 31.

Referring to FIG. 19 and FIG. 20, a depth of the bottom surface 31 is less than a thickness of the sealing member 190. Therefore, in the sliding process of the end 1 relative to the mounting groove 30, the bottom surface 31 may extrude the sealing member 190 upwards to make a mounting layer on a top face of the sealing member 190 attached to the inner wall of the mounting groove 30.

It should be noted that the bottom surface 31 may be parallel relative to the top face of the end 1 or may be inclined relative to the top face of the end 1. When the bottom surface is inclined, the bottom surface 31 and the top face of the end 1 form an included angle, for example, in the extending direction of the limiting groove 3, an end of the bottom surface 31 may incline to the other end in a gradual deepening direction. Therefore, when the sealing member 190 enters the limiting groove 3 from a deeper end, in the sliding process of the end 1 relative to the mounting groove 30, the bottom surface 31 may gradually extrude the sealing member 190 upwards to make the top face of the sealing member 190 mounted on the inner side wall of the mounting groove 30 more firmly.

Still referring to FIG. 19 and FIG. 20, an interval between the two side walls 32 may fit the width of the sealing member 190, that is, the interval is equal to the width of the sealing member 190, and the sealing member 190 can right penetrate between the two side walls 32 of the limiting groove 3.

In the sliding process of the end 1 relative to the mounting groove 30, the two side walls 32 may limit the sealing member 190 from the two sides of the sealing member 190 to gradually extrude the side portions of the sealing member 190, so that the sealing member 190 is gradually mounted on a required position with sliding of the end 1.

In some embodiments, the interval between the two side walls 32 may also be larger than the width of the sealing member 190. In the sliding process of the end 1 relative to the mounting groove 30, the sealing member 190 is extruded to be limited only by the side wall 32 on one side of the limiting groove 3, and the sealing member 190 can also be gradually mounted at the required position.

Referring to FIG. 17, an inclined portion 33 is arranged at an end of the bottom surface 31. The inclined portion 33 inclines to a direction of gradually deepening the limiting groove 3 along a direction from the inside to outer sides of the end. The inclined portion 33 may be an inclined plane or inclined arc surface.

When the end 1 extends into the mounting groove 30, the inclined portion 33 is gradually away from the inner side walls of the mounting groove 30 corresponding to the bottom surface 31 along the direction from the inside to the outer side of the end, so that a depth of the entrance of the limiting groove 3 forms an effect that the outside is deeper than the inside, and a depth of an external outlet may be greater than the thickness of the sealing member 190.

During assembly of the sealing member 190, the end of the sealing member 190 may smoothly enter into the limiting groove 3 from the inclined portion 33. With the sealing member 190 gradually extending into the limiting groove 3, through matching of the inclined portion 33 and the bottom surface 31, the sealing member 190 may be gradually extruded to make the sealing member 190 attached to the inner side wall of the mounting groove 30 firmly, bubbles on the mounting surface can be prevented, thus mounting effect is improved.

It can be understood that the inclined portion 33 may be disposed only at one end of the bottom surface 31 or disposed at the two ends of the bottom surface 31. When the inclined portions 33 are disposed at the two ends of the bottom surface 31, the sealing member 190 may enter into the limiting groove 3 from any end of the bottom surface 31, and then the flexibility of the mounting tool 10 can be improved, which allows for selection of using the right or left hand, and effectively improving efficiency of the sealing member 190.

In some embodiments, the width of the inclined portion 33 is gradually increased in the direction from the inside to the outer side of the end of the bottom surface 31. That is, in the direction from the inside to the outer side of the end, the interval between the side walls 32 on the two sides of the inclined portion 33 is gradually widened, and then the width of the end entrance of the limiting groove 3 forms an effect that the outside is wider than the inside. During assembly of the sealing member 190, the ends of the sealing member 190 may more smoothly enter into the limiting groove 3 from the inclined portion 33.

Referring to FIG. 17, in some embodiments, the mounting tool 10 may further include a pressing portion which is disposed on the bottom surface 31 of the limiting groove 3 in a protruding mode.

When the limiting groove 3 slides relative to the mounting groove 30, on the basis that the pressing portion can extrude the sealing member 190 on the bottom surface 31, the sealing member 190 is further pressed to be firmly attached to the inner side walls of the mounting groove 30.

A plurality of pressing portions may be disposed, and the plurality of pressing portions are arranged at intervals along the extending direction of the limiting groove 3. When the limiting groove 3 slides relative to the mounting groove 30, the plurality of pressing portions may repeatedly press the sealing member 190 to further improve the mounting firmness of the sealing member 190.

It can be understood that the pressing portions may be integrally formed with the bottom surface 31 of the limiting groove 3, or removably disposed with the limiting groove 3, as long as the pressing portions can protrude from the bottom surface 31.

Referring to FIG. 18, in some embodiments, the mounting tool 10 further includes a pressing element 4. An accommodating groove 5 for mounting the pressing element 4 is formed in the end 1, and the accommodating groove 5 is in communication with the limiting groove 3.

The pressing element 4 is rotatably disposed in the accommodating groove 5, and the pressing element 4 partially extends out of the accommodating groove 5 and protrudes from the bottom surface 31 of the limiting groove 3. The portion of the pressing element 4 protruding from the bottom surface 31 is used as a pressing portion.

Rotating surface of the pressing element 4 is parallel to the extending direction of the limiting groove 3 and parallel to the bottom surface 31 of the limiting groove 3, so that a rolling direction of the pressing element 4 is consistent with a sliding direction of the limiting groove 3.

When the limiting groove 3 slides relative to the mounting groove 30, the portion of the pressing element 4 protruding from the bottom surface 31 may be used as the pressing portion to further press the sealing member 190. Meanwhile, the pressing element 4 can match with the surface of the sealing member 190 in rolling to make the mounting tool 10 slide more smoothly, thus saving time and labor.

In some embodiments, the mounting tool 10 further includes a pivot 6, and the pivot 6 is configured to mount the pressing element 4 in the accommodating groove 5. The pivot 6 may penetrate through the accommodating groove 5, the pivot 6 is sleeved with the pressing element 4, and the axis of the pivot 6 is used as rotating axis of the pressing element. It can be understood that the pressing element 4 and the pivot 6 may also be integrally formed, that is, rotating shaft extends from axis of two ends of the pressing element 4 respectively and are rotatably connected with inner walls of the accommodating groove 5.

In some embodiments, a shaft hole 7 is formed in an end face of the handheld end 2, and the shaft hole 7 extends from the end face of the handheld end 2 to the end 1 and penetrates through the limiting groove 3. The pivot 6 may be inserted into the shaft hole 7 through the end face of the handheld end and penetrated through the pressing element 4 in the accommodating groove 5, thereby simplifying the structure of the mounting tool 10, facilitating assembling and disassembling of internal structures of the mounting tool 10.

In some embodiments, a limiting portion 61 is disposed at the end of the pivot 6 close to the end face of the handheld end 2, and the diameter of the limiting portion 61 is greater than the diameter of the pivot 6. A limiting step matched with the limiting portion 61 is disposed at the position of the shaft hole 7 close to the end face of the handheld end 2. The pivot 6 can be conveniently positioned in the shaft hole 7 by utilizing the limiting portion 61 and the limiting step. In addition, a threaded hole section may also be partially disposed in the shaft hole 7, the pivot 6 is provided with a corresponding external threaded section, and thus the pivot 6 can be locked in the shaft hole 7 via threaded connection.

In some embodiments, the pressing element 4 may be implemented as a bearing, and the bearing includes an inner ring 41 and an outer ring 42 which are coaxially disposed. The inner ring 41 of the bearing fixedly sleeves the pivot 6. The outer ring 42 of the bearing can rotate relative to the inner ring 41 and partially protrudes from the bottom surface 31 of the limiting groove 3. The portion of the outer ring 42 protruding from the bottom surface 31 is used as a pressing portion. The inner ring 41 and the outer ring 42 of the bearing are matched to position the pressing element 4 on the pivot 6 so as to prevent axial movement of the pressing element 4 on the pivot 6, and then the pressing element 4 and the sealing member 190 relatively move more stably and smoothly. It can be understood that the pressing element 4 may also be a roller, and the roller rotatably sleeve the pivot 6, which can also achieve the rolling pressing effect.

It can be known that the embodiments of the disclosure at least has the following advantages and benefits: the mounting tool 10 in the embodiments of the disclosure is configured to attach the sealing member to the mounting groove 30 extending along a straight line and can stretch into the mounting groove 30 by utilizing the end 1, and the end face, as the abutting surface 11, of the end 1 can abut against the inner wall of the mounting groove 30 to make the end 1 parallelly slide along the mounting groove 30.

The end 1 and the sealing member can be placed into the mounting groove 30 at the same time, with the side face having a bonding layer of the sealing member being back to the bottom surface 31 of the limiting groove 3; and an end of the sealing member stretches into the limiting groove 3, the mounting tool 10 is held to slide by abutting against the inner wall of the mounting groove 30, and thus the limiting groove 3 slides relative to the sealing member at the same time. In the sliding process, by utilizing the size fit of the limiting groove 3 and the sealing member, the sealing member is gradually extruded through the bottom surface 31 of the limiting groove 3, so that the sealing member is gradually attached to the inner side wall of the mounting groove 30. Meanwhile, the sealing member is gradually limited from the side portion of the sealing member through the side walls 32 of the limiting groove 3 in a travelling direction of the limiting groove 3, so that the sealing member is gradually fixed at a required position.

The mounting tool 10 is easy and convenient to operate, the relative position of the mounting tool 10 to the mounting groove 30 can be controlled only by gently abutting the abutting surface 11 of the end 1 of the mounting tool against the inner wall of the mounting groove 30 to slide, and thus the sealing member limited to the mounting tool 10 can be quickly and precisely attached to the mounting groove 30, thus time and labor are saved, the attachment efficiency of the sealing member is improved, and then the overall assembly efficiency of the display apparatus can be improved.

In order to achieve full-screen and ultra-thin goal for the television, a scheme of clamping a middle frame on a backplane is replaced with the C-shaped bended structure on the edge of the backplane, that is, a display panel of the television is directly attached to the structure formed by bending the backplane through tape, and thus a front housing and frame structure of the television is omitted. This type of television has the advantages such as low weight, thin thickness and a higher degree of full-screen.

With the backplane of this structure, when three or more edges of the backplane need to be bent in a C shape, bending joints of adjacent bent structures need to be welded and polished. In this welding process, the bending joints need to be welded by using a laser welding device, and welded positions need to be polished by using a polishing device after welding. Consequently, a manufacturing process for manufacturing the backplane of the television is complex and high in requirement.

Figure 21:
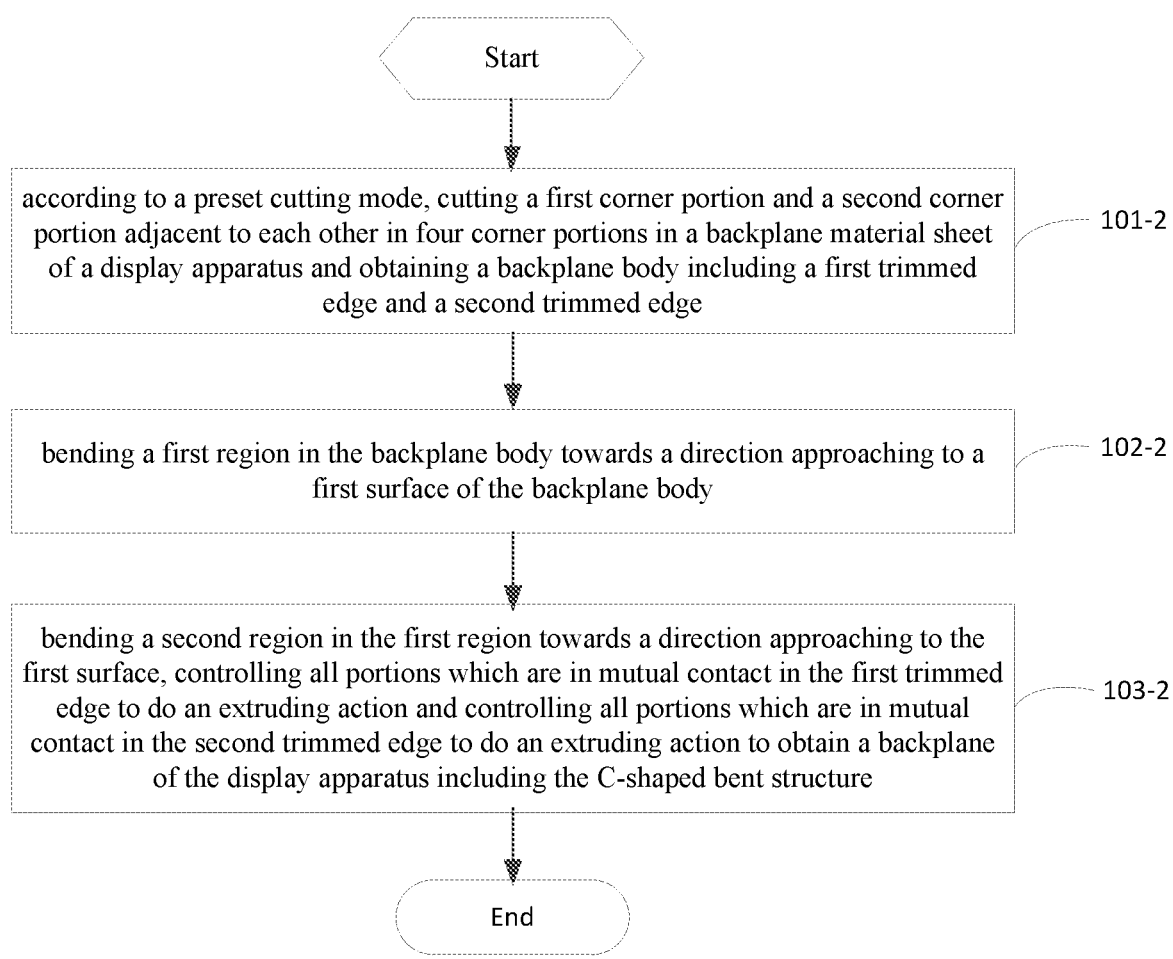
FIG. 21 is a flow diagram of a method for manufacturing a backplane of a display apparatus according to some embodiments of the disclosure.

Referring to FIG. 21, FIG. 21 is a flow diagram of a method for manufacturing a backplane of a display apparatus according to some embodiments of the disclosure. As shown in FIG. 21, the method includes the following steps.

Step 101-2, according to a preset cutting mode, cutting a first corner portion and a second corner portion adjacent to each other in four corner portions in a backplane material sheet of a display apparatus and obtaining a backplane body including a first trimmed edge and a second trimmed edge, wherein the first trimmed edge is formed by cutting the first corner portion, and the second trimmed edge is formed by cutting the second corner portion.

Figure 22:
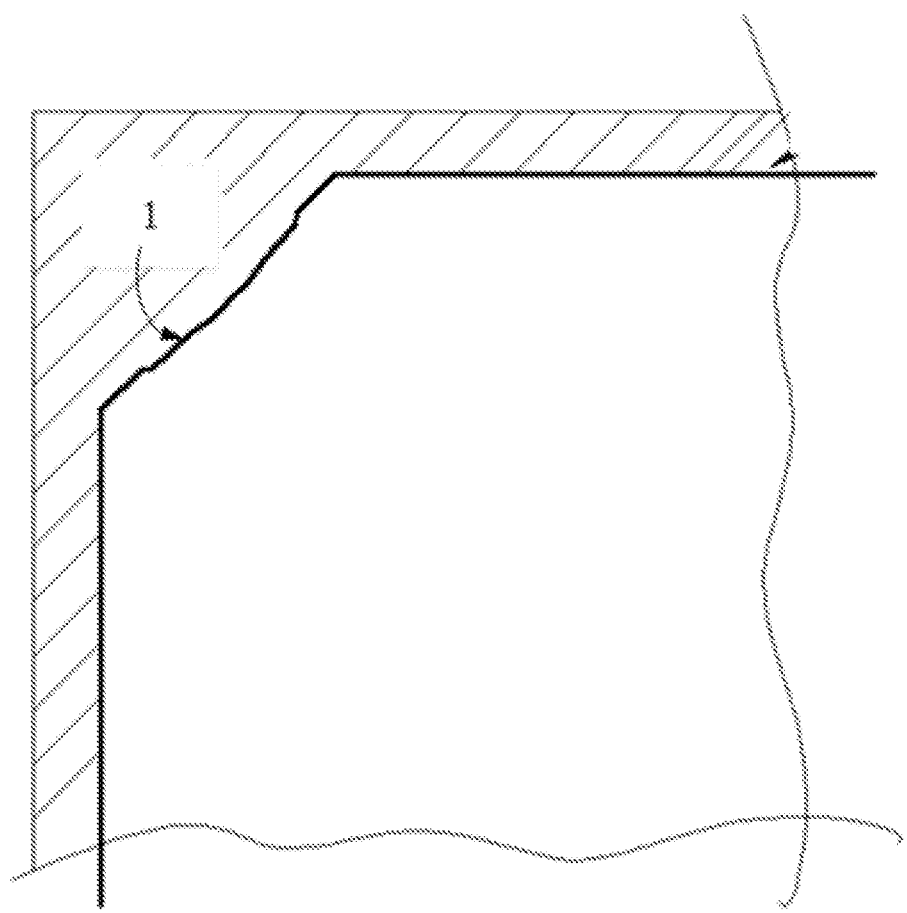
FIG. 22 is a schematic diagram for illustrating cutting of a backplane material sheet and trimmed edges according to some embodiments of the disclosure.

In step 101-2, the first corner portion and the second corner portion adjacent to each other in the four corner portions included in the backplane material sheet of the display apparatus may be cut according to the preset cutting mode to obtain the backplane body including the first trimmed edge 1 and the second trimmed edge. The first trimmed edge 1 is formed by cutting the first corner portion, and the second trimmed edge is formed by cutting the second corner portion. As shown in FIG. 22, it is a schematic diagram showing cutting of the backplane material sheet of the display apparatus to obtain the trimmed edges.

In some embodiments of the disclosure, after the step that the first corner portion and the second corner portion adjacent to each other in the four corner portions in the backplane material sheet of the display apparatus are cut according to the preset cutting mode to obtain the backplane body including the first trimmed edge and the second trimmed edge, the method further includes:

preforming edge processing on the first trimmed edge and the second trimmed edge.

It should be noted that since a C-shaped bent structure needs to be in direct contact with structural members of a display module in the display apparatus, edge processing may be performed on the first trimmed edge 1 and the second trimmed edge to remove burrs and make the first trimmed edge 1 and the second trimmed edge smoother.

Step 102-2, bending a first region in the backplane body towards a direction approaching to a first surface of the backplane body, wherein the first region includes a first edge, the first trimmed edge, a second edge, the second trimmed edge and a third edge which are connected in order along a clockwise direction.

In step 102-2, the first region M in the backplane body may be bent towards the direction approaching to the first surface N of the backplane body, wherein the first region M includes the first edge 2, the first trimmed edge 1, the second edge 3, the second trimmed edge and the third edge which are connected in order along the clockwise direction.

In some embodiments of the disclosure, bending the first region in the backplane body towards the direction approaching to the first surface of the backplane body includes:

bending the first region by 90 degrees towards the direction approaching to the first surface.

Figure 23:
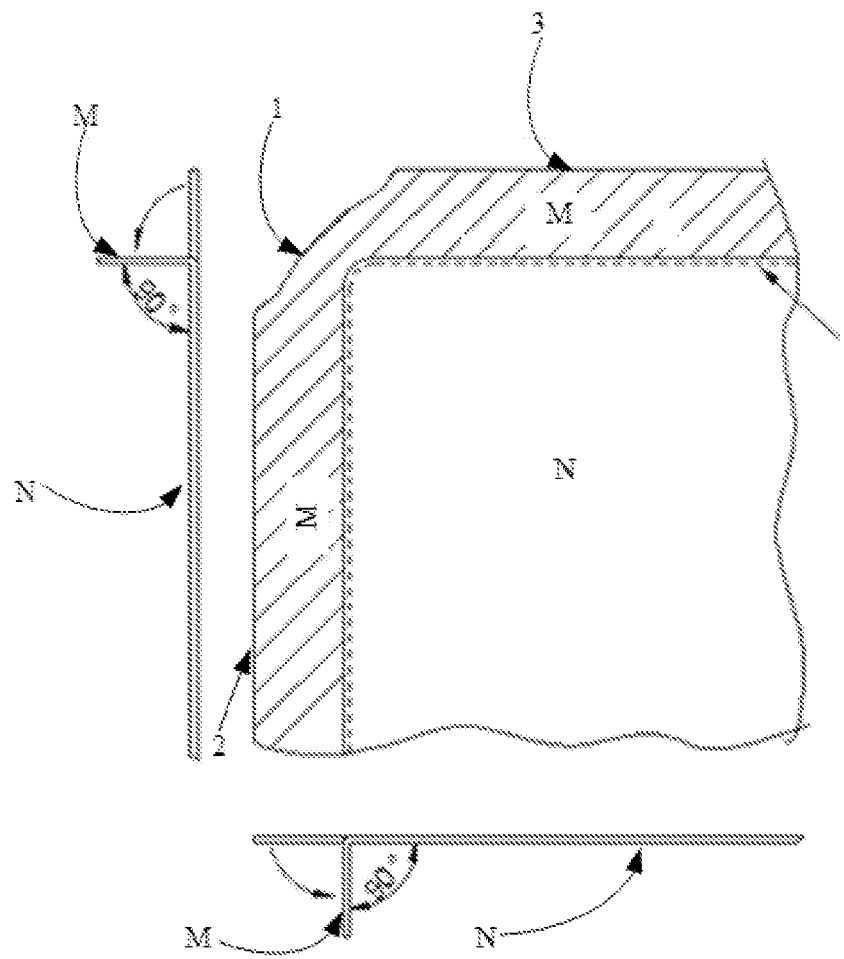
FIG. 23 is a schematic diagram of bending a first region by 90 degrees towards a direction approaching to a first surface according to some embodiments of the disclosure.

Further, the first region M may be bent by 90 degrees towards the direction approaching to the first surface N. For example, the first region M may be bent by 90 degrees towards the direction approaching to the first surface N along a bending line F to make the first region M perpendicular to the first surface N. As shown in FIG. 23, it is a schematic diagram of bending the first region by 90 degrees towards the direction approaching to the first surface.

Step 103-2, bending a second region in the first region towards a direction approaching to the first surface, controlling all portions which are in mutual contact in the first trimmed edge to do an extruding action and controlling all portions which are in mutual contact in the second trimmed edge to do an extruding action to obtain a backplane of the display apparatus including the C-shaped bent structure, wherein the second region includes the first edge, the first trimmed edge, the second edge, the second trimmed edge and the third edge which are sequentially connected along the clockwise direction.

In step 103-2, the second region O in the first region M is bent towards the direction approaching to the first surface N, all the portions which are in mutual contact in the first trimmed edge 1 are controlled to do the extruding action, and all the portions which are in mutual contact in the second trimmed edge are controlled to do the extruding action to obtain the backplane of the display apparatus including the C-shaped bent structure. For example, the first trimmed edge 1 and the second trimmed edge may be controlled to do a corner extruding action to make materials extruded out by the extruding action flow into splicing seams formed by corner portions. The size of the splicing seams may be designed by controlling a cutting shape of the trimmed edges, and the seam gap size is made to fall within the range of 0.0 mm to 1.0 mm. The second region O includes the first edge 2, the first trimmed edge 1, the second edge 3, the second trimmed edge and the third edge which are sequentially connected along the clockwise direction.

It should be noted that, in the related art, when three or more edges of the backplane need to be bent in a C shape, bending joints of adjacent bent structures need to be welded and polished. In this welding process, the bending joints need to be welded by using a laser welding device, and welded positions need to be polished by using a polishing device after welding. Consequently, a manufacturing process for manufacturing the backplane of the television is complex and high in requirement.

While in the present disclosure, a corner weld-forming scheme is replaced with a corner extrusion-forming process without the laser welding device and the polishing device, the manufacturing process is simple, and the cost is saved.

In some embodiments of the disclosure, bending the second region in the first region towards the direction approaching to the first surface includes:

bending the second region by 45 degrees towards the direction approaching to the first surface.

The second region bent by 45 degrees towards the direction approaching to the first surface is bent by 45 degrees towards the direction approaching to the first surface to make the second region parallel to the first surface.

Figure 24:
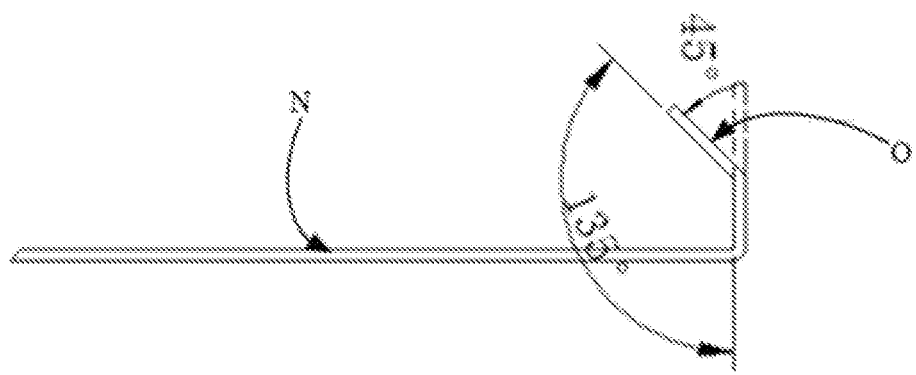
FIG. 24 is a schematic diagram of bending a second region by 45 degrees towards a direction approaching to a first surface according to some embodiments of the disclosure.

Further, the second region O may be bent by 45 degrees towards the direction approaching to the first surface N. As shown in FIG. 24, it is a schematic diagram of bending the second region by 45 degrees towards the direction approaching to the first surface.

Figure 25:
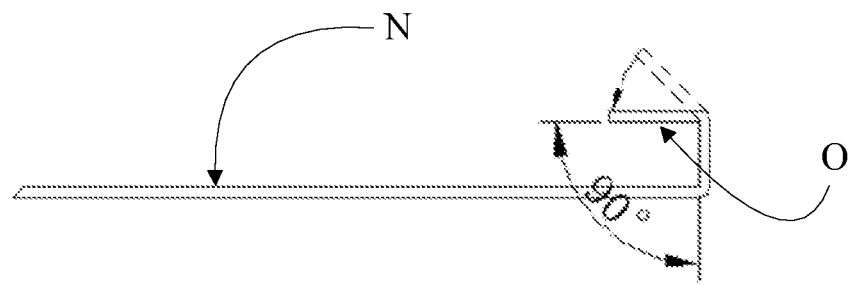
FIG. 25 is a schematic diagram of a bent second region being parallel to a first surface according to some embodiments of the disclosure.

Next, the second region O bent by 45 degrees towards the direction approaching to the first surface N is bent by 45 degrees again towards the direction approaching to the first surface N to make the bent second region O parallel to the first surface N. As shown in FIG. 25, it is a schematic diagram of the bent second region being parallel to the first surface. It should be noted that, when the second region in the first region is bent towards the direction approaching to the first surface, the angle in the two times of bending is not necessarily to be 45 degrees both. For example, the second region may also be bent by 30 degrees towards the direction approaching to the first surface first, and next, the second region which is bent by 30 degrees towards the direction approaching to the first surface may be bent by 60 degrees again towards the direction approaching to the first surface. As long as the second region is parallel to the first surface after two times of bending. Moreover, the second region in the first region may also be bent by 90 degrees directly towards the direction approaching to the first surface without two times of bending.

In some embodiments of the disclosure, after the step that controlling all the portions which are in mutual contact in the first trimmed edge to do the extruding action, and controlling all the portions which are in mutual contact in the second trimmed edge to do the extruding action, the method further includes:

in a target plane parallel to the first surface and away from the first surface in the bent second region, a region in which all the portions in the first trimmed edge are in mutual contact is subjected to a flattening operation, and a region in which all the portions in the second trimmed edge are in mutual contact is subjected to a flattening operation.

It should be noted that, after all the portions which are in mutual contact in the first trimmed edge 1 are controlled to do the extruding action, and all the portions which are in mutual contact in the second trimmed edge are controlled to do the extruding action, for the first trimmed edge 1 and the second trimmed edge, all the portions which are in mutual contact in each trimmed edge may have wrinkles due to mutual extrusion, causing a plane for mounting the display panel of the display apparatus in the formed C-shaped bent structure being not smooth enough.

Figure 26:
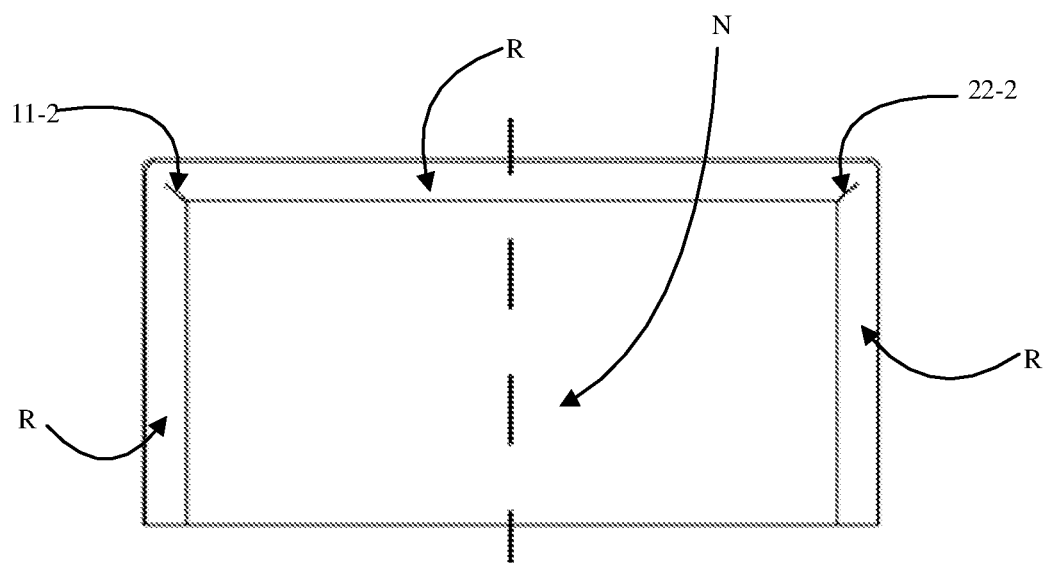
FIG. 26 is a schematic diagram of a manufactured backplane of a display apparatus according to some embodiments of the disclosure.
Figure 27:
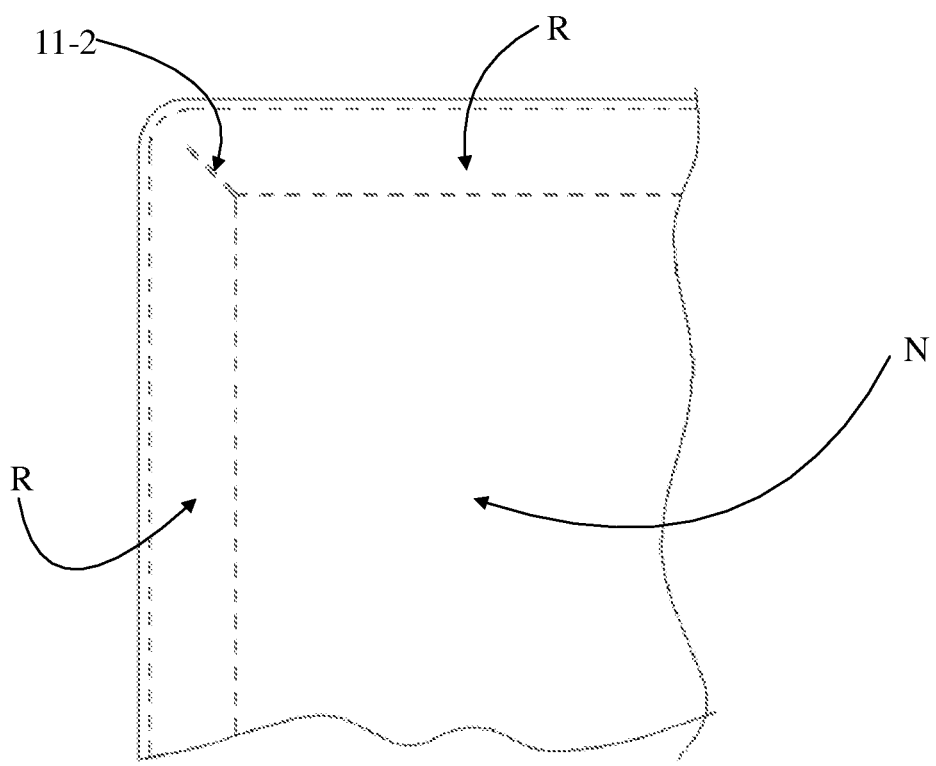
FIG. 27 is a schematic partially enlarged diagram of a manufactured backplane of a display apparatus according to some embodiments of the disclosure.

Therefore, in the target plane R parallel to the first surface N and away from the first surface N in the bent second region O, the region 11-2 where all the portions in the first trimmed edge 1 are in mutual contact is subjected to the flattening operation, and the region 22-2 where all the portions in the second trimmed edge are in mutual contact is subjected to the flattening operation. The region 11-2 where all the portions in the first trimmed edge 1 are in mutual contact and the region 22-2 where all the portions in the second trimmed edge are in mutual contact are the aforementioned splicing seams formed by the corner portions. Therefore, the target plane R for mounting the display panel of the display apparatus in the C-shaped bent structure may be firmer when the display panel of the display apparatus is mounted. As shown in FIG. 26, it is a schematic diagram of a manufactured backplane of a display apparatus. As shown in FIG. 27, it is a schematic locally-enlarged diagram of the manufactured backplane of the display apparatus.

It can be known that, in the method for manufacturing the backplane of the display apparatus according to the embodiments of the disclosure, the first corner portion and the second corner portion adjacent to each other in the four corner portions in the backplane material sheet of the display apparatus are cut according to the preset cutting mode to obtain the backplane body including the first trimmed edge and the second trimmed edge, wherein the first trimmed edge is formed by cutting the first corner portion, and the second trimmed edge is formed by cutting the second corner portion; the first region in the backplane body is bent towards the direction approaching to the first surface of the backplane body, wherein the first region includes the first edge, the first trimmed edge, the second edge, the second trimmed edge and the third edge which are sequentially connected along the clockwise direction; and the second region in the first region is bent towards the direction approaching to the first surface, all the portions which are in mutual contact in the first trimmed edge are controlled to go through the extruding action, and all the portions which are in mutual contact in the second trimmed edge are controlled to go through the extruding action to obtain the backplane of the display apparatus including the C-shaped bent structure, wherein the second region includes the first edge, the first trimmed edge, the second edge, the second trimmed edge and the third edge which are sequentially connected along the clockwise direction. In this way, the corner weld-forming scheme is replaced with the corner extrusion-forming process without the laser welding device and the polishing device, the manufacturing process is simplified, and the cost is saved.

The above discussion is only for illustration, but the scope of protection of the disclosure is not limited to this. Modifications and substitutes that can be easily obtained by any person skilled in the art without departing from the spirits of the disclosure shall fall within the protection scope of the disclosure.

What is claimed is:

1. A television, comprising:
a liquid crystal panel, including a display region and a circuit board, and configured to display an image driven by the circuit board;
a backlight source, configured to provide back light for the liquid crystal panel;
a light homogenizing element, configured to homogenize light rays from the backlight source, wherein the liquid crystal panel is located on a light emitting side of the light homogenizing element; and
a backplane, comprising a first side, a second side opposite to the first side, a third side and a fourth side opposite to the third side,
wherein the fourth side has a second structure different from a first structure which the first side, the second side and the third side all have, and
the first side comprises a first step portion and a second step portion, wherein the second step portion is configured to support the liquid crystal panel, and the first step portion is configured to support the light homogenizing element;
wherein the television further comprises:
an inner frame, disposed on a surface of a side of the second step portion facing the first step portion; and
a sealing member disposed on a surface of a side of the inner frame facing the first step portion.

2. The television according to claim 1, further comprises:
an optical film, configured to brighten the light rays from the backlight source; and
a film bonding element disposed between the light homogenizing element and the optical film;
wherein the film bonding element is located on an edge of the light homogenizing element at a same side with the optical film.

3. The television according to claim 1, wherein the inner frame comprises a first surface and a second surface opposite to the first surface, the first surface is fixed on the surface of the side of the second step portion facing the first step portion, and at least one first positioning part is provided on the first surface of the inner frame.

4. The television according to claim 1, wherein the inner frame comprises a first surface and a second surface opposite to the first surface, the first surface is fixed on the surface of the side of the second step portion facing the first step portion, and at least one second positioning part is provided on the second surface of the inner frame.

5. The television according to claim 3, wherein one of the at least one first positioning part is a recess.

6. The television according to claim 1, wherein the inner frame is an integrally extrusion-molded soft frame.

7. The television according to claim 1, wherein the inner frame comprises a first part made of a first material and a second part made of a second material different from the first material; wherein the second material is softer than the first material, and the first part is fixed to the surface of the side of the second step portion facing the first step portion.

8. The television according to claim 7, wherein the first material comprises Polypropylene (PP), and the second material comprises Thermoplastic Vulcanizate (TPV) or Thermoplastic Elastomer (TPE).

9. The television according to claim 1, wherein the sealing member comprises a foam tape, the foam tape is of a three-layer structure which comprises a first layer, a second layer and a third layer between the first layer and the second layer, the first layer is made of a base material and the second layer is made of an abrasion-resistant material and the third layer is made of foam.

10. The television according to claim 1, wherein the first side further comprises a side wall for connecting the first step portion and the second step portion, an accommodating space is formed by the first step portion, the side wall and the second step portion, and edges of the light homogenizing element and an optical film are placed in the accommodating space.

11. The television according to claim 10, wherein the first step portion, the second step portion and the side wall for connecting the first step portion and the second step portion are configured to form a C shape.

12. The television according to claim 10, wherein the first step portion, the side wall and the second portion are of an integrated structure.

13. The television according to claim 1, wherein the inner frame is configured to attach to the first side, the second side and the third side of the backplane.

14. The television according to claim 1, wherein the liquid crystal panel comprises an in-plane switching panel.

* * * * *